(12) United States Patent
Graf et al.

(10) Patent No.: US 12,258,754 B2
(45) Date of Patent: Mar. 25, 2025

(54) DOUBLE-FAÇADE ARRANGEMENT

(71) Applicant: GLAS TRÖSCH HOLDING AG, Buochs (CH)

(72) Inventors: Roman Graf, Gunzgen (CH); Andreas Synowczyk, Zofingen (CH)

(73) Assignee: GLAS TRÖSCH HOLDING AG, Buochs (CH)

( * ) Notice: Subject to any disclaimer, the term of this patent is extended or adjusted under 35 U.S.C. 154(b) by 209 days.

(21) Appl. No.: 17/635,230

(22) PCT Filed: Jun. 19, 2020

(86) PCT No.: PCT/EP2020/067188
§ 371 (c)(1),
(2) Date: Feb. 14, 2022

(87) PCT Pub. No.: WO2021/032339
PCT Pub. Date: Feb. 25, 2021

(65) Prior Publication Data
US 2022/0290424 A1 Sep. 15, 2022

(30) Foreign Application Priority Data
Aug. 16, 2019 (EP) ..................................... 19192059

(51) Int. Cl.
*E04B 1/74* (2006.01)
*B01D 53/22* (2006.01)
(Continued)

(52) U.S. Cl.
CPC .............. *E04B 1/74* (2013.01); *B01D 53/228* (2013.01); *E06B 9/24* (2013.01); *F24F 5/0075* (2013.01);
(Continued)

(58) Field of Classification Search
CPC . E04B 1/74; E04B 2/88; B01D 53/228; E06B 9/24; E06B 2009/2417; F24F 5/0075; F24F 2005/0082; F24S 20/66
See application file for complete search history.

(56) References Cited

U.S. PATENT DOCUMENTS 4,237,865 A * 12/1980 Lorenz ...................... E04B 1/74
126/599
10,130,097 B2 * 11/2018 Meier ................... C03C 17/225
(Continued)

FOREIGN PATENT DOCUMENTS

DE 202009015506 U1 2/2010
WO 2013011240 A2 1/2013
(Continued)

*Primary Examiner* — Omar F Hijaz
(74) *Attorney, Agent, or Firm* — Benesch Friedlander Coplan & Aronoff LLP

(57) ABSTRACT

The invention relates to a double-façade arrangement (1) for a construction (70), in particular a building, a bridge support, a bridge pier or a noise barrier wall, comprising a double façade (20) for generating a vertically directed air flow (50) by means of the chimney effect. Here, the double façade (20) comprises an inner façade (21) and an outer façade (22), wherein a façade interspace (23) for guiding the air flow (50) is situated between the inner façade (21) and the outer façade (22), wherein the inner façade (21) delimits the façade interspace (23) towards the construction (70), and the outer façade (22) delimits the façade interspace (23) towards the surroundings (60) of the construction (70). Furthermore, the double façade (20) comprises an air inlet (24) to allow the air flow (50) with air from the surroundings (60) to be let into the façade interspace (23) and, arranged above the air inlet (24), an air outlet (25) to allow at least some of the air flow (50) to be let out of the façade interspace (23). Moreover, the double-façade arrangement (1) comprises a carbon dioxide separator device (2) for separating at least
(Continued)

some of the carbon dioxide from the air of the air flow (50). Furthermore, the invention relates to a construction (70), in particular a building, a bridge support or a bridge pier having such a double-façade arrangement (1). In addition, the invention relates to the use of such a double-façade arrangement (1) or construction (70) having such a double-façade arrangement (1) for generating a vertically directed air flow (50) by means of the chimney effect and for separating carbon dioxide from the air of the air flow (50).

21 Claims, 3 Drawing Sheets

(51) Int. Cl.
    *E04B 2/88*     (2006.01)
    *E06B 9/24*     (2006.01)
    *F24F 5/00*     (2006.01)
    *F24S 20/66*     (2018.01)

(52) U.S. Cl.
    CPC ............. *F24S 20/66* (2018.05); *E04B 2/88* (2013.01); *E06B 2009/2417* (2013.01); *F24F 2005/0082* (2013.01)

(56) References Cited

U.S. PATENT DOCUMENTS

2009/0000475 A1*   1/2009   Fekety ................. B01D 53/228
                                                                                     502/4
2023/0191322 A1*   6/2023   Shors ....................... C22B 7/00
                                                                                      423/220

FOREIGN PATENT DOCUMENTS

WO          2013053486 A2     4/2013
WO          2013066253 A1     5/2013
WO     WO-2018100400 A1 *   6/2018     ............ C12M 21/02

* cited by examiner

DOUBLE-FAÇADE ARRANGEMENT

TECHNICAL FIELD

The invention relates to a twin facade arrangement for an above-ground construction, especially a building, a bridge support, a bridge pier or a noise barrier wall, comprising a twin facade for generation of a vertically directed air stream by chimney effect, wherein the twin facade comprises an inner facade and an outer facade, wherein a facade interspace for guiding the air stream exists between the inner facade and the outer facade, wherein the inner facade bounds the facade interspace with respect to the above-ground construction and the outer facade bounds the facade interspace with respect to an environment of the above-ground construction, and wherein the twin facade comprises an air inlet for introduction of the air stream with air from the environment into the facade interspace and an air outlet, disposed above the air inlet, for discharge of at least a portion of the air stream from the facade interspace. The invention further relates to an above-ground construction having such a twin facade arrangement and to the use of such a twin facade arrangement or of such an above-ground construction.

STATE OF THE ART

Twin facade arrangements according to the technical field cited at the outset are known. DE 20 2009 015 506 U1 to Franz Hesendenz GmbH, for example, describes a twin facade arrangement having a twin facade for multistory buildings, having an outer facade, an inner facade and a facade interspace disposed between the outer facade and the inner facade. Disposed within the outer facade are an air inlet at the bottom and an air outlet at the top, such that, when heat is introduced into the facade interspace, air ascends within the facade interspace.

A further, similar twin facade arrangement is described in WO 2013/053486 A2 to Thermic Renewables GmbH.

Some of these known twin facade arrangements do enable the obtaining of alternative energies, and hence are beneficial to the climate and environment. However, such twin facade arrangements have barely any effect on the environment in the immediate surroundings of the above-ground construction with the corresponding twin facade arrangement. Thus, these twin facade arrangements have the disadvantage that their local influence on the quality of life of people, animals and plants is very limited.

In the present text, the form of words "and/or" is used repeatedly. In each case, two statements or features are linked to one another by this form of words. This in each case is a non-exclusive disjunction of the two statements or features. Thus, at least one of the two statements in each case is applicable, or at least one of the two features in each case is present. Accordingly, both statements in each case may be applicable or else just one of the two statements may be applicable, or both features in each case may occur together or else only one of the two features may occur.

In the present text, what is preferably meant by the form of words "solar radiation-absorbing glass" in relation to glass and outer facade glass, inner facade glass and intermediate facade glass is that the solar radiation-absorbing glass in question has greater absorption of solar radiation, integrated over a range of wavelengths from 800 nm to 2300 nm of solar radiation, by at least 20%, more preferably by at least 50%, than a solar radiation absorption of a reference glass integrated over the same range. If the solar radiation absorption of the solar radiation-absorbing glass is achieved mainly by an elevated iron oxide content, the reference glass is preferably a glass identical to the solar radiation-absorbing glass, except that the reference glass has an iron oxide content of 200 ppm. If the solar radiation absorption of the solar radiation-absorbing glass, by contrast, is achieved mainly by an elevated content of another component, the reference glass is preferably a glass identical to the solar radiation-absorbing glass, except that the reference glass has a content of this component of 50 ppm. If the solar radiation absorption of the solar radiation-absorbing glass is achieved mainly by a solar radiation-absorbing interlayer, the reference glass is preferably a glass identical to the solar radiation-absorbing glass, except that the reference glass does not have the solar radiation-absorbing interlayer.

In the present text, what is preferably meant by the form of words "solar radiation-reflecting glass" in relation to outer facade glass, inner facade glass and intermediate facade glass is that the solar radiation-reflecting glass in question has greater reflection of solar radiation, integrated over a range of wavelengths from 800 nm to 2300 nm of solar radiation, by at least 20%, more preferably by at least 50%, than a reflection of solar radiation of a reference glass integrated over the same range. If the reflection of solar radiation by the solar radiation-reflecting glass is achieved mainly by a solar radiation-reflecting interlayer, the reference glass is preferably a glass identical to the solar radiation-reflecting glass, except that the reference glass does not have the solar radiation-reflecting interlayer.

In the present text, what is preferably meant by the form of words "solar radiation-absorbing coating" is that the glass in question, for example outer facade glass, inner facade glass or intermediate facade glass coated with the solar radiation-absorbing coating, has greater absorption of solar radiation, integrated over a range of wavelengths from 800 nm to 2300 nm of solar radiation, by at least 20%, more preferably by at least 50%, than an absorption of solar radiation by a reference glass integrated over the same range, with the reference glass being identical to the glass in question, but not having the solar radiation-absorbing coating, i.e. with the reference glass being identical to the glass in question apart from the lack of the solar radiation-absorbing coating.

In the present text, what is preferably meant by the form of words "solar radiation-reflecting coating" is that the glass in question, for example outer facade glass, inner facade glass or intermediate facade glass coated with the solar radiation-reflecting coating, which, integrated over a range of wavelengths from 800 nm to 2300 nm of solar radiation, is greater by at least 20%, more preferably by at least 50%, than a reflection of solar radiation by a reference glass integrated over the same range, with the reference glass being identical to the glass in question but not having the solar radiation-reflecting coating, i.e. with the reference glass being identical to the glass in question apart from the lack of the solar radiation-absorbing coating.

SUMMARY OF THE INVENTION

It is an object of the invention to provide a twin facade arrangement belonging to the technical field cited at the outset, which is both beneficial to the climate and to the environment and locally increases the quality of life of people, animals and plants in the immediate surroundings of the twin facade arrangement.

The way in which the object is achieved is defined by the features of claim 1. According to the invention, the twin facade arrangement comprises a carbon dioxide segregation apparatus for segregation of at least a portion of the carbon dioxide from the air of the air stream. The principle on which the segregation of carbon dioxide brought about by the carbon dioxide segregation apparatus is based is immaterial here. For instance, the segregation may be based on a biological principle, for example on the carbon dioxide-segregating action of enzymes, algae, bacteria or else plants, for example mosses, grasses or shrubs. The segregation may alternatively be based on a chemical principle, for example a catalysis reaction at an activated surface. This activated surface may, for example, be within a filter. Moreover, the segregation may be based on a physical principle, for example absorption/desorption. Moreover, the segregation may also be based on an electrochemical principle, such as a redox reaction in an electrolysis cell.

According to the invention, the twin facade arrangement is suitable for an above-ground construction, especially a building, a bridge support, a bridge pier or a noise barrier wall. A building is understood here to mean a built structure which includes at least one space, can be entered and serves to accommodate humans or animals, or to store items. These include, for example, industrial buildings, above-ground office buildings, conference centers, stadiums, above-ground residential and hotel buildings, and terminals of railway stations and airports. This likewise includes, for example, silos, which, as is well known, are large stores for bulk material and can be entered for maintenance work. By contrast, bridge supports and bridge piers serve primarily as supports for a bridge. Bridge piers are wall-like components that extend essentially over an entire width of the bridge superstructure, whereas bridge supports have a width significantly smaller than the width of the bridge superstructure. Thus, bridge supports and bridge piers are above-ground built structures, but not necessarily buildings. However, it is also quite possible that a bridge support or a bridge pier is at the same time also a building if it includes at least one room, can be entered and serves to accommodate humans or animals, or to store items.

According to the invention, the twin facade arrangement comprises a twin facade. This may be a vertically aligned twin facade. However, it may also be a tilted or obliquely aligned twin facade tilted by up to 45°, preferably up to 35°, with respect to a vertically aligned plane. In this case, the twin facade may be overhanging or, instead of being overhanging, may assume a roof function. It is additionally possible that the twin facade is curved or kinked. In this case, it is possible that the twin facade has solely overhanging regions, solely regions that assume a roof function, overhanging and vertically aligned regions, vertically aligned regions and regions that assume a roof function, or overhanging regions and regions that assume a roof function and also vertical regions if any.

It is immaterial for the object according to the invention how much of the overall facade of the above-ground construction is accounted for by the twin facade. For instance, the twin facade may cover just one wall or side of the above-ground construction. It may alternatively cover just part of one wall or side of the above-ground construction. It is equally possible that the twin facade may alternatively cover several walls, for example all walls, or several sides, for example all sides, of the above-ground construction.

According to the invention, the twin facade is suitable for generation of a vertically directed air stream by chimney effect. What is meant here by the wording "vertically directed air stream" is preferably an air stream having a net flow of air, with a flow direction of the net flow having a vertical component and correspondingly not just being aligned purely horizontally. The flow direction of the net flow is preferably essentially vertically aligned and is therefore preferably inclined at an angle of not more than 45°, more preferably not more than 35°, relative to a vertically aligned line. It is immaterial here whether the air stream is laminar or has vortices. Since, according to the invention, the air outlet is disposed above the air inlet, an air stream flowing through the air inlet into the facade interspace, at least a portion of which exits again from the facade interspace through the air outlet, is a vertically aligned air stream. In this case, the net flow of the air stream is directed upward, which means that the air stream is also directed vertically upward.

According to the invention, the air stream is generated by chimney effect. The chimney effect is a physical effect that causes vertically aligned air flows. The chimney effect is based on natural convection. It is utilized industrially, for example, to lead off offgases from furnaces through chimneys. The basis of the chimney effect is that hot air has a lower density than cold air, which gives rise to thermal convection. In the present case of the twin facade, on account of thermal convection, air exits through the air outlet disposed above the air inlet. This gives rise to a reduced pressure in the facade interspace, and the outside pressure pushes air through the air inlet into the facade interspace, which is likewise heated. This causes the effect to be self-sustaining, and this generates and maintains the vertically aligned air stream.

According to the invention, the air inlet serves for introduction of the air stream with air from the environment of the above-ground construction and hence with ambient air into the facade interspace. The air inlet here may introduce ambient air directly and immediately into the facade interspace. In this case, the air inlet is disposed directly on the twin facade and hence connects the environment of the above-ground construction to the facade interspace. In this case, the air inlet may be disposed, for example, in the outer facade and hence connect the environment of the above-ground construction directly to the facade interspace. In one variant, for this purpose, the air inlet may also be connected to an air conduit that may form part of the twin facade arrangement, which guides ambient air via the air inlet into the facade interspace. In this case, for example, the air conduit may have an inlet directly in the road surface or in the ground beside a street running past the above-ground construction and lead underground to the air inlet and hence directly to the facade interspace, or first through an interior of the above-ground construction to the air inlet and hence indirectly to the facade interspace. In this last variant, the air inlet is preferably disposed in the inner facade.

According to the invention, the air outlet serves for discharge of at least a portion of the air stream from the facade interspace. The air outlet preferably serves to discharge at least 90%, more preferably at least 95%, of the air stream from the facade interspace. It is immaterial here whether the air outlet connects the facade interspace directly or indirectly to the environment of the above-ground construction, so that air from the facade interspace can access the environment of the above-ground construction. For example, the air outlet may be disposed in the outer facade or in the roof of the above-ground construction and connect the facade interspace directly to the environment of the above-ground construction. It is alternatively likewise possible for the air outlet to lead into an interior of the above-ground construction, whence the air stream is subsequently guided further into the environment of the above-ground construction.

The twin facade arrangement of the invention may be constructed and created together with an above-ground construction, especially a building, a bridge support or a bridge pier. The twin facade arrangement of the invention may alternatively be constructed subsequently for an already existing above-ground structure, especially a building, a bridge support or a bridge pier, and be added onto this already existing above-ground structure by creation of the twin facade arrangement.

Since the twin facade arrangement comprises the carbon dioxide segregation apparatus for segregation of at least a portion of the carbon dioxide from the air of the air stream, the twin facade arrangement is beneficial to the climate and the environment and locally increases the quality of life of humans, animals and plants in the direct environment of the twin facade arrangement.

Advantageously, the carbon dioxide segregation apparatus is simultaneously also a nitrogen oxide segregation apparatus for segregation of at least a portion of the nitrogen oxides from the air of the air stream. This has the advantage that the carbon dioxide segregation apparatus can segregate both carbon dioxide and nitrogen oxides from the air of the air stream. The segregation of the nitrogen oxides may be based on a biological principle, for example on the carbon dioxide-segregating effect of enzymes, algae, bacteria or else plants, for example mosses, grasses or shrubs. The segregation may alternatively be based on a chemical principle, for example a catalysis reaction at an activated surface. The activated surface may, for example, be within a filter. Moreover, the segregation may be based on a physical principle, for example absorption/desorption. Moreover, the segregation may also be based on an electrochemical principle, such as a redox reaction in an electrolysis cell. In a preferred variant, the segregation of the carbon dioxide and the segregation of the nitrogen oxides are based on the same biological principle, chemical principle or physical principle. In a further variant, the segregation of the carbon dioxide and the segregation of the nitrogen oxides are based on different principles.

Alternatively, it is also possible, however, that the carbon dioxide segregation apparatus is not simultaneously a nitrogen oxide segregation apparatus.

Advantageously, the carbon dioxide segregation apparatus is simultaneously also a sulfur oxide segregation apparatus for segregation of at least a portion of the sulfur oxides from the air of the air stream. It is possible here that the carbon dioxide segregation apparatus is simultaneously a nitrogen oxide segregation apparatus, or that the carbon dioxide segregation apparatus is not simultaneously a nitrogen oxide segregation apparatus. Regardless of whether the carbon dioxide segregation apparatus is simultaneously a nitrogen oxide segregation apparatus or not, the fact that the carbon dioxide segregation apparatus is simultaneously a sulfur oxide segregation apparatus achieves the advantage that the carbon dioxide segregation apparatus can segregate both carbon dioxide and sulfur oxides and optionally nitrogen oxides from the air of the air stream. The segregation of the sulfur oxides here may be based on a biological principle, for example on the carbon dioxide-segregating action of enzymes, algae, bacteria or else plants, for example mosses, grasses or shrubs. The segregation may alternatively be based on a chemical principle, for example a catalysis reaction at an activated surface. The activated surface may, for example, be within a filter. Moreover, the segregation may be based on a physical principle, for example absorption/desorption. Moreover, the segregation may also be based on an electrochemical principle, such as a redox reaction in an electrolysis cell. In a preferred variant, the segregation of the carbon dioxide and the segregation of the sulfur oxides and optionally the segregation of the nitrogen oxides are based on the same biological principle, chemical principle or physical principle. In a further variant, the segregation of the carbon dioxide or of the nitrogen oxides and the segregation of the sulfur oxides are based on different principles.

Alternatively, it is also possible, however, that the carbon dioxide segregation apparatus is not simultaneously a sulfur oxide segregation apparatus. The carbon dioxide segregation apparatus here may be a pure carbon dioxide segregation apparatus or else a carbon dioxide segregation apparatus and a nitrogen oxide segregation apparatus. Unless explicitly mentioned otherwise in the variants and embodiments specified hereinafter, in a first variation, the carbon dioxide segregation apparatus is simultaneously a nitrogen oxide segregation apparatus and a sulfur oxide segregation apparatus. In a second variation, by contrast, the carbon dioxide segregation apparatus is simultaneously a nitrogen oxide segregation apparatus, but not a sulfur oxide segregation apparatus. In a third variant, the carbon dioxide segregation apparatus is simultaneously a sulfur oxide segregation apparatus, but not a nitrogen oxide segregation apparatus. In a fourth variant, by contrast, the carbon dioxide segregation apparatus is not simultaneously a nitrogen oxide segregation apparatus and also not simultaneously a sulfur oxide segregation apparatus.

In a preferred variant, the carbon dioxide segregation apparatus has an interior and an air stream air inlet for introduction of at least a portion of the air stream, more preferably of the entire air stream, into the interior of the carbon dioxide segregation apparatus. It is immaterial here whether the carbon dioxide segregation apparatus in the facade interspace, specifically adjoining the facade interspace, is disposed in an interior of the above-ground construction or in an environment of the above-ground construction. Irrespective of this, the interior of the carbon dioxide segregation apparatus has the advantage that the elements and units of the carbon dioxide segregation apparatus that are of relevance for the segregation of carbon dioxide can be optimally protected from outside damaging effects.

In a preferred variant thereof, the air outlet of the twin facade is connected to the air flow air inlet, or the air outlet simultaneously forms the air flow air inlet. This achieves the advantage that the maximum amount of air, especially preferably the entire air stream, can be guided to the carbon dioxide segregation apparatus, which means that the total amount of the carbon dioxide segregated in the operation of the twin facade arrangement can be increased. It is possible here that the carbon dioxide segregation apparatus also has an air flow air outlet for discharge of the air that has got into the interior of the carbon dioxide segregation apparatus.

In one variant, however, it is also possible that the air flow air inlet is not connected to the air outlet. In this way, for example, the carbon dioxide segregation apparatus, as well as the air flow air inlet, may also have an air flow air outlet for discharge of the air that has got into the interior of the carbon dioxide segregation apparatus, in which case both the air flow air inlet and the air flow air outlet are connected to the facade interspace between the air inlet and the air outlet, such that at least a portion of the air stream, preferably the entire air stream, is guided intermediately into the interspace of the carbon dioxide segregation apparatus as it flows through the facade interspace from the air inlet to the air outlet for carbon dioxide segregation. It is immaterial here whether the air stream is guided from the facade interspace into the interior of the carbon dioxide segregation apparatus, or whether the air stream remains in the facade interspace because the interior of the carbon dioxide segregation apparatus is disposed in the facade interspace.

As an alternative to these variants, it is also possible that the carbon dioxide segregation apparatus has no such interior and no such air flow air inlet.

Irrespective of whether the carbon dioxide segregation apparatus has an interior and an air flow air inlet for introduction of at least a portion of the air stream into the interior of the carbon dioxide segregation apparatus or not, the carbon dioxide segregation apparatus preferably has a contact surface for contacting of air of the air stream for segregation of carbon dioxide from the air of the air stream. If the carbon dioxide segregation apparatus is simultaneously a nitrogen oxide segregation apparatus, the carbon dioxide segregation apparatus preferably has a contact surface for contacting of air of the air stream for segregation of nitrogen oxides from the air of the air stream. The contact surface for segregation of nitrogen oxides is preferably the same contact surface as the contact surface for segregation of carbon dioxide. However, the contact surfaces may also be different contact surfaces. In this case, the contact surface for segregation of nitrogen oxides is a nitrogen oxide segregation contact surface, whereas the contact surface for segregation of carbon dioxide is a carbon dioxide segregation contact surface. If the carbon dioxide segregation apparatus is simultaneously a sulfur oxide segregation apparatus, the carbon dioxide segregation apparatus preferably has a contact surface for contacting of air of the air stream for segregation of sulfur oxides from the air of the air stream. The contact surface for segregation of sulfur oxides is preferably the same contact surface as the contact surface for segregation of carbon dioxide. However, the contact surfaces may also be different contact surfaces. In this case, the contact surface for segregation of sulfur oxides is a sulfur oxide segregation contact surface, whereas the contact surface for segregation of carbon dioxide is a carbon dioxide segregation contact surface. It is possible here that the contact surface for segregation of sulfur oxides is simultaneously a contact surface for segregation of nitrogen oxides. Alternatively, the contact surface for segregation of sulfur oxides may likewise not simultaneously be a contact surface for segregation of nitrogen oxides. If the carbon dioxide segregation apparatus has an interior and an air flow air inlet for introduction of at least a portion of the air stream into the interior of the carbon dioxide segregation apparatus, the contact surface(s) is/are preferably within the interior of the carbon dioxide segregation apparatus. Alternatively, however, it is also possible that the contact surface(s) is/are outside the interior of the carbon dioxide segregation apparatus. Reference is made hereinafter in each case to "the contact surface". If the carbon dioxide segregation apparatus is simultaneously a nitrogen oxide segregation apparatus and has two contact surfaces or one carbon dioxide segregation contact surface and one nitrogen oxide segregation contact surface, "the contact surface" relates in each case both to the carbon dioxide segregation contact surface and to the nitrogen oxide segregation contact surface. Otherwise, "the contact surface" in each case relates to the contact surface which is a contact surface for contacting of air of the air stream for segregation of carbon dioxide from the air of the air stream and optionally a contact surface for contacting of air of the air stream for segregation of nitrogen oxides from the air of the air stream. If the carbon dioxide segregation apparatus, by contrast, is simultaneously a sulfur oxide segregation apparatus and has two contact surfaces or one carbon dioxide segregation contact surface and one sulfur oxide segregation contact surface, "the contact surface" relates in each case both to the carbon dioxide segregation contact surface and to the sulfur oxide segregation contact surface. Otherwise, "the contact surface" relates in each case to the contact surface which is a contact surface for contacting of air of the air stream for segregation of carbon dioxide from the air of the air stream and optionally a contact surface for contacting of air of the air stream for segregation of sulfur oxides from the air of the air stream. If the carbon dioxide segregation apparatus, by contrast, is simultaneously a nitrogen oxide segregation apparatus and also a sulfur oxide segregation apparatus and has three contact surfaces or one carbon dioxide segregation contact surface, one nitrogen oxide segregation contact surface and one nitrogen oxide segregation contact surface or else two contact surfaces or one carbon dioxide segregation contact surface and one contact surface for segregation of nitrogen oxides and sulfur oxides, one nitrogen oxide segregation contact surface and one contact surface for segregation of carbon dioxide and sulfur oxides, or one sulfur oxide segregation contact surface and one contact surface for segregation of carbon dioxide and nitrogen oxides, "the contact surface" relates in each case to the respective contact surfaces. Otherwise, "the contact surface" relates in each case to the contact surface which is a contact surface for contacting of air of the air stream for segregation of carbon dioxide from the air of the air stream and optionally a contact surface for contacting of air of the air stream for segregation of nitrogen oxides from the air of the air stream and optionally a contact surface for contacting of air of the air stream for segregation of sulfur oxides from the air of the air stream.

In a first preferred variant, the contact surface itself has a carbon dioxide-segregating or optionally nitrogen oxide-segregating or sulfur oxide-segregating effect. For example, the contact surface, for this purpose, may be a reactive metal surface. If the contact surface itself has a carbon dioxide-segregating or optionally nitrogen oxide-segregating or sulfur oxide-segregating effect, the contact surface may be disposed, for example, on a surface past which the air stream or at least part of the air stream flows. Equally, the contact surface may alternatively be formed by a surface of a filter through which the air stream or at least part of the air stream is guided. In this case, the entire active filter surface area that comes into contact with the air stream or at least part of the air stream forms the surface of the filter and hence the contact surface. If the filter has a porous structure through which the air stream or at least part of the air stream is guided, insides of the pores correspondingly also form constituents of the contact surface. In a further example in this regard, the contact surface is a ceramic. The ceramic may consist, for example, of a mixture of metal oxides. The ceramic here is preferably a porous ceramic. A porous ceramic has the advantage that a surface area of the ceramic is increased compared to a nonporous ceramic. Accordingly, a porous ceramic has a comparatively high surface area on which chemical reactions can proceed. Advantageously, the porous ceramic has pores having an average pore size within a range from 5 μm to 100 μm.

In a second preferred variant, the carbon dioxide segregation apparatus comprises a contact surface for contacting of air of the air stream for segregation of carbon dioxide from the air of the air stream, wherein the contact surface is a selectively permeable separation apparatus, by means of which air of the air stream is separable from a fluid, with the selectively permeable separation apparatus being permeable to carbon dioxide, by means of which carbon dioxide from the air of the air stream can get into the fluid for segregation of the carbon dioxide. If the carbon dioxide segregation apparatus is simultaneously a nitrogen oxide segregation apparatus, the permeable separation apparatus is preferably permeable to nitrogen oxides, which means that nitrogen oxides from the air of the air stream can get into the fluid for segregation of the nitrogen oxides. If the carbon dioxide segregation apparatus is simultaneously a sulfur oxide segregation apparatus, the permeable separation apparatus is preferably permeable to sulfur oxides, which means that sulfur oxides from the air of the air stream can get into the fluid for segregation of the sulfur oxides. This means that the selectively permeable separation apparatus does separate the fluid from the air stream but is permeable to carbon dioxide and optionally nitrogen oxides or sulfur oxides, such that carbon dioxide or nitrogen oxides or sulfur oxides can get into the fluid from the air of the air stream. The selectively permeable separation apparatus thus has the advantage that the carbon dioxide or nitrogen oxides or sulfur oxides can get into the fluid from the air of the air stream in order to be segregated from the fluid. Whether the fluid here is a gas or a liquid is irrelevant. If the fluid is a gas, the gas may be a pure gas or a dispersion with aerosols dispersed in the gas. The aerosols here may be liquid aerosols or else solid aerosols. If the fluid is a liquid, the liquid may be a pure liquid or a dispersion with particles or gas bubbles dispersed in the liquid.

In a preferred variant, the fluid contains $H_2O$, i.e. water in liquid form or in the form of water vapor. The water may also be present in the fluid in the form of droplets in a gas. For example, the droplets may form aerosols. In this case, the carbon dioxide segregation apparatus preferably comprises an atomizer for generation of the droplets or aerosols. In a first preferred variation, the fluid is enriched with inorganic compounds, especially with at least one of inorganic oxides, inorganic hydroxides and inorganic salts. This has the advantage that these inorganic oxides, inorganic hydroxides or inorganic salts can bind carbon dioxide. The inorganic oxides, inorganic hydroxides or inorganic salts here preferably contains elements from at least the first or second main group of the Periodic Table. In a second preferred variation, the fluid is enriched with at least one of lactates and anions of lactic acid. This has the advantage that this can create an optimal environment for photosynthetically active bacteria or algae that can convert lactate with carbon dioxide to pyruvate and anions of lactic acid to anions of pyruvic acid. Accordingly, the fluid may also be provided with such bacteria algae.

In a first preferred variation thereof, the selectively permeable separation apparatus is a grid or mesh by means of which the air of the air stream is separable from a gas, especially air. This firstly has the advantage that larger particles in the air of the air stream can be stopped in a simple manner from reaching an opposite side of the selectively permeable separation apparatus from the air of the air stream. Secondly, however, this also has the advantage that, on an opposite side of the selectively permeable separation apparatus from the air of the air stream, it is possible to reduce flows and turbulences in the gas or the air by comparison with flows and turbulences in the air stream, or else to monitor and control them independently of the air stream. In this way, it is possible to create optimal conditions on the opposite side of the selectively permeable separation apparatus from the air of the air stream in order to segregate the carbon dioxide or the nitrogen oxides or the sulfur oxides from the gas or the air. If the carbon dioxide segregation or the segregation of the nitrogen oxides or the segregation of sulfur oxides is based on a biological principle, and is based, for example, on enzymes, algae, bacteria or else plants, for example mosses, grasses or shrubs, it is thus possible, on the opposite side of the selectively permeable separation apparatus from the air of the air stream, to create optimal conditions for the enzymes, algae, bacteria or else plants, for example mosses, grasses or shrubs. These conditions may encompass, for example, a particular range of moisture content or air humidity or a particular temperature range. It is thus possible to protect the enzymes, algae, bacteria or else plants, for example mosses, grasses or shrubs, from drying out or overheating.

More preferably, the grid or mesh has grid openings or mesh openings, with a maximum diameter of the grid openings or mesh openings within a range from 0.01 mm to 20 mm or from 0.1 mm to 20 mm, more preferably from 0.1 mm to 5 mm, most preferably from 0.1 mm to 1 mm. Alternatively, it is also possible, however, that the grid openings or mesh openings have a maximum diameter of less than 0.01 mm or more than 20 mm.

In a second preferred variation thereof, the selectively permeable separation apparatus is a membrane by means of which air of the air stream is separable from a fluid, wherein the membrane is permeable to carbon dioxide, by means of which carbon dioxide from the air of the air stream can get into the fluid for segregation of the carbon dioxide. Irrespective of whether the fluid is a gas or a liquid and is at most one of the aforementioned dispersions, the membrane is preferably formed by a compact carbon dioxide-permeable material. This material may take the form, for example, of a thin film. If the carbon dioxide separation apparatus is simultaneously a nitrogen oxide segregation apparatus, the membrane is preferably permeable to nitrogen oxides, which means that nitrogen oxides from the air of the air stream can get into the fluid for segregation of the nitrogen oxides. If the carbon dioxide segregation apparatus is simultaneously a sulfur oxide segregation apparatus, the membrane is preferably permeable to sulfur oxides, which means that sulfur oxides from the air of the air stream can get into the fluid for segregation of the sulfur oxides. This means that the membrane does separate the fluid from the air stream, but is permeable to carbon dioxide and optionally nitrogen oxides or sulfur oxides, such that carbon dioxide or nitrogen oxides or sulfur oxides from the air of the air stream can get into the fluid. In this case, the carbon dioxide segregation apparatus preferably comprises a fluid reservoir containing the fluid. In this case, carbon dioxide or nitrogen oxides or sulfur oxides are segregated from the air of the air stream in that the carbon dioxide or the nitrogen oxides or the sulfur oxides get into the fluid. However, there is preferably additionally also segregation of the carbon dioxide or of the nitrogen oxides or of the sulfur oxides from the fluid. As already mentioned, this segregation may be based on a biological, chemical or physical principle. For example, the carbon dioxide segregation apparatus may comprise a nanoporous metal foil disposed in the fluid for adsorption of carbon dioxide or nitrogen oxide or sulfur oxide.

In a first preferred variation, the membrane is a membrane by means of which air of the air stream is separable from a liquid, especially aqueous liquid, wherein the membrane is permeable to carbon dioxide, by means of which carbon dioxide from the air of the air stream can get into the liquid, especially aqueous liquid, for segregation of the carbon dioxide. The liquid may be a high-viscosity liquid in gel form or a low-viscosity liquid, for example water. Irrespective of the viscosity of the liquid and irrespective of whether the liquid is a pure liquid or a dispersion with particles or gas bubbles dispersed in the liquid, the membrane is preferably formed by a compact gas-permeable material. In this case, the carbon dioxide segregation apparatus preferably comprises a liquid reservoir comprising the liquid, especially the aqueous liquid. This material may take the form, for example, of a thin foil. If the carbon dioxide segregation apparatus is simultaneously a nitrogen oxide segregation apparatus, the membrane is preferably permeable to nitrogen oxides, which means that nitrogen oxides from the air of the air stream can get into the liquid for segregation of the nitrogen oxides. If the carbon dioxide segregation apparatus is simultaneously a sulfur oxide segregation apparatus, the membrane is preferably permeable to sulfur oxides, which means that sulfur oxides from the air of the air stream can get into the liquid for segregation of the sulfur oxides. This means that the membrane does separate the liquid from the air stream, but is permeable to carbon dioxide and optionally nitrogen oxides or sulfur oxides, such that carbon dioxide or nitrogen oxides or sulfur oxides from the air of the air stream can get into the liquid. Carbon dioxide or nitrogen oxides or sulfur oxides are segregated here from the air of the air stream in that the carbon dioxide or the nitrogen oxides or the sulfur oxides get into the liquid. However, there is preferably additionally also segregation of the carbon dioxide or of the nitrogen oxides or of the sulfur oxides from the liquid. This segregation may, as already mentioned, be based on a biological, chemical or physical principle. For example, the carbon dioxide segregation apparatus may comprise a nanoporous metal foil disposed in the liquid for adsorption of carbon dioxide or nitrogen oxide or sulfur oxide. Since, in the case of an aqueous liquid, according to the membrane, water vapor can exit from the aqueous liquid through the membrane into the air stream, the carbon dioxide segregation apparatus additionally optionally preferably comprises a refilling inlet for refilling the liquid in the liquid reservoir. In a preferred variant, the liquid is an electrolyte, especially an aqueous electrolyte.

In a second preferred variation, the membrane is a membrane by means of which air of the air stream is separable from a gas, wherein the membrane is permeable to carbon dioxide, by means of which carbon dioxide from the air of the air stream can get into the gas for segregation of the carbon dioxide. The gas may be a pure gas or a dispersion with aerosols dispersed in the gas, in which case the aerosols may be liquid aerosols or else solid aerosols. Irrespective of this, the membrane is preferably formed by a compact carbon dioxide-permeable material. This material may take the form, for example, of a thin film. If the carbon dioxide segregation apparatus is simultaneously a nitrogen oxide segregation apparatus, the membrane is preferably permeable to nitrogen oxides, which means that nitrogen oxides from the air of the air stream can get into the gas for segregation of the nitrogen oxides. If the carbon dioxide segregation apparatus is simultaneously a sulfur oxide segregation apparatus, the membrane is preferably permeable to sulfur oxides, which means that sulfur oxides from the air of the air stream can get into the gas for segregation of the sulfur oxides. This means that the membrane does separate the gas from the air stream, but is permeable to carbon dioxide and optionally nitrogen oxides or sulfur oxides, such that carbon dioxide or nitrogen oxides or sulfur oxides from the air of the air stream can get into the gas. Carbon dioxide or nitrogen oxides or sulfur oxides are segregated here from the air of the air stream in that the carbon dioxide or the nitrogen oxides or the sulfur oxides get into the gas. However, there is preferably additionally also segregation of the carbon dioxide or of the nitrogen oxides or of the sulfur oxides from the gas. This segregation may, as already mentioned, be based on a biological, chemical or physical principle. For example, the carbon dioxide segregation apparatus may comprise a nanoporous metal foil disposed in the gas for adsorption of carbon dioxide or nitrogen oxide or sulfur oxide.

If the carbon dioxide segregation apparatus comprises the contact surface mentioned for contacting of the air of the air stream for segregation of carbon dioxide which is a selectively permeable separation apparatus by means of which air of the air stream is separable from a fluid, with the selectively permeable separation apparatus being permeable to carbon dioxide, by means of which carbon dioxide from the air of the air stream can get into the fluid for segregation of the carbon dioxide, and if additionally the fluid is a gas, especially air, the carbon dioxide segregation apparatus preferably additionally has a further contact surface for contacting of the gas or of the air on an opposite side of the selectively permeable separation apparatus from the air of the air stream for segregation of carbon dioxide from this gas or this air, with this further contact surface preferably being a membrane and hence a further selectively permeable separation apparatus by means of which the gas or the air is separable from a further fluid on the opposite side of the selectively permeable separation apparatus from the air of the air stream, wherein the membrane is permeable to carbon dioxide, which means that carbon dioxide from this gas or this air can get into the further fluid for segregation of the carbon dioxide. Irrespective of whether the selectively permeable separation apparatus here is a grid, a mesh or a membrane, the membrane that forms this further contact surface is preferably disposed on the opposite side of the selectively permeable separation apparatus from the air of the air stream.

If the carbon dioxide segregation apparatus is simultaneously a nitrogen oxide segregation apparatus, the membrane that forms this further contact surface is preferably permeable to nitrogen oxides, which means that nitrogen oxides from the gas or the air can get into the further fluid for segregation of the nitrogen oxides. If the carbon dioxide segregation apparatus is simultaneously a sulfur oxide segregation apparatus, the membrane that forms this further contact surface is preferably permeable to sulfur oxides, which means that sulfur oxides from the gas or the air can get into the further fluid for segregation of the sulfur oxides. This means that the membrane does separate the further fluid from the gas or the air, but is permeable to carbon dioxide and optionally nitrogen oxides or sulfur oxides, such that carbon dioxide or nitrogen oxides or sulfur oxides from the air of the air stream can get into the further fluid.

If the carbon dioxide segregation apparatus has the aforementioned contact surface for contacting of air of the air stream for segregation of nitrogen oxides from the air of the air stream, with this contact surface being a selectively permeable separation apparatus by means of which the air of the air stream is separable from a fluid, with the selectively permeable separation apparatus being permeable to carbon dioxide and if necessary to nitrogen oxides and/or sulfur oxides, by means of which carbon dioxide or nitrogen oxides or sulfur oxides from the air of the air stream can get into the fluid for segregation of the carbon dioxide or of the nitrogen oxides or of the sulfur oxides, this selectively permeable separation apparatus, as already mentioned, may be a membrane by means of which air of the air stream is separable from a fluid. Irrespective of whether this selectively permeable separation apparatus is this membrane or not, the carbon dioxide segregation apparatus may additionally also, as already mentioned, have a further contact surface for contacting of the gas or of the air on an opposite side of the selectively permeable separation apparatus from the air of the air stream for segregation of carbon dioxide from this gas or this air. As already mentioned, this further contact surface may be a membrane and hence a further selectively permeable separation apparatus by means of which the gas or the air is separable from a further fluid on the opposite side of the selectively permeable separation apparatus from the air of the air stream, with this further membrane being permeable to carbon dioxide or nitrogen oxides or sulfur oxides, by means of which carbon dioxide or nitrogen oxides or sulfur oxides from this gas or this air can get into the further fluid for segregation of the carbon dioxide or of the nitrogen oxides or of the sulfur oxides. Both of these membranes preferably have particular features. These preferred features are elucidated in more detail hereinafter. For the sake of simplicity, reference is made in each case to "the membrane". This reference means that, in the case of presence of one of the two aforementioned membranes, this one of the two aforementioned membranes preferably has the features elucidated hereinafter. In the case of presence of both the aforementioned membranes, by contrast, this reference means that preferably one of the two aforementioned membranes has, or both the aforementioned membranes have, these preferred features.

The membrane has preferably been coated with a metal, more preferably with gold, silver, platinum, palladium, copper, manganese, tantalum, vanadium or a combination thereof. Of these variants, for example, a coating with platinum has the particular advantage that nascent hydrogen is generated on the platinum coating, by means of which the carbon dioxide can be reduced. For example, this can generate water and ethanol from the carbon dioxide and the hydrogen. It is thus possible by means of a coating with metal to achieve a chemical reaction for segregation of carbon dioxide even at the membrane, which increases the efficiency of the carbon dioxide segregation.

If the membrane forms the aforementioned contact surface for contacting of air of the air stream for segregation of carbon dioxide from the air of the air stream which is a selectively permeable separation apparatus by means of which air of the air stream is separable from a fluid, and the fluid is a liquid, the coating is preferably disposed on a side of the membrane removed from the air of the air stream and hence on a side of the membrane facing the liquid. If the membrane, by contrast, forms the aforementioned further contact surface and the further fluid is a liquid, the coating is preferably disposed on a side of the membrane facing the liquid. Both of these has the advantage that chemical reactions of the liquid with the coating are enabled.

In a preferred variant, the membrane has been coated with a metal oxide, especially copper oxide. In this variant, the fluid or the further fluid preferably contains $H_2O$, i.e. water in liquid form or in the form of water vapor. The water may also be present in the fluid in the form of droplets in a gas. For example, the droplets may form aerosols. If the fluid is a liquid, the liquid is preferably water or contains water. In one variant for this purpose, the liquid or the fluid may alternatively not contain any water. If the fluid or the liquid contains water in liquid form or in the form of water vapor, this achieves the advantage that, firstly, carbon dioxide dissolved in the water and forms carbonic acid and that, secondly, metal hydroxide or copper hydroxide, which is a weak base, is formed in the coating of the membrane with metal oxide, especially copper oxide. This weak base forms a metal carbonate or copper carbonate in reaction with the carbonic acid, which binds carbon dioxide. If the carbon dioxide segregation apparatus is simultaneously a nitrogen oxide segregation apparatus, the advantage is additionally achieved that the nitrogen oxides dissolve in the water and form an acid. If the carbon dioxide segregation apparatus is simultaneously a sulfur oxide segregation apparatus, the advantage is additionally achieved that the sulfur oxides dissolve in the water and form an acid. These acids likewise react with the metal hydroxide or copper hydroxide to give nitrates. Advantageously, the coating of the membrane comprises potassium or calcium. This has the advantage of formation of nitrates, carbonates or sulfates that can be used as plant growth promoters.

If the membrane forms the aforementioned contact surface for contacting of air of the air stream for segregation of carbon dioxide from the air of the air stream which is a selectively permeable separation apparatus by means of which air of the air stream is separable from a fluid, the coating is disposed on a side of the membrane remote from the air of the air stream and hence on a side of the membrane facing the fluid and hence the liquid or the gas. If the membrane, by contrast, forms the aforementioned further contact surface and the further fluid is a liquid, the coating is preferably disposed on a side of the membrane facing the liquid. Both have the advantage that chemical reactions of the fluid or of the liquid or the gas with the coating are enabled.

If the fluid is a liquid, the coating of the membrane preferably takes the form of a cathode of an electrochemical cell, the liquid being an aqueous electrolyte. This has the advantage that the reaction to give a metal carbonate or copper carbonate is reversible.

In a preferred variant, the membrane is coated with a ceramic. The ceramic may consist, for example, of a mixture of metal oxides. The ceramic is preferably a porous ceramic. A porous ceramic has the advantage that a surface area of the ceramic is increased compared to a nonporous ceramic. Accordingly, a porous ceramic has a comparatively high surface area on which chemical reactions can proceed. Advantageously, the porous ceramic has pores having an average pore size within a range from 5 μm to 100 μm.

In one variant, however, it is also possible that the membrane is not coated with metal, not coated with a metal oxide and not coated with a ceramic, and hence is free of metal coating and free of ceramic coating.

The membrane preferably comprises a plastic, in particular one or more fluoropolymers. In a preferred variant thereof, the membrane additionally contains one or more metals or one or more metal oxides.

In a particularly preferred variant, the membrane comprises polytetrafluoroethylene (PTFE). This has the advantage that the membrane is very unreactive and comparatively long-lived. As a variant, however, it is also possible that the membrane does not comprise polytetrafluoroethylene (PTFE). For example, the membrane may comprise polysulfones, polyethersulfone (PES), cellulose, cellulose esters (cellulose acetate, cellulose nitrate), regenerated cellulose (RC), silicones, polyamides, polyamideimide, polyamideurea, polycarbonates, ceramic, stainless steel, silver, silicon, zeolites (aluminosilicates), polyacrylonitrile (PAN), polyethylene (PE), polypropylene (PP), polyvinylidenefluoride (PVDF), polyvinylchloride (PVC), polypiperazineamide or combinations thereof with or without polytetrafluoroethylene (PTFE).

As an alternative to these variants, it is also possible, however, that the carbon dioxide segregation apparatus does not comprise a membrane.

The liquid preferably contains a propylene glycol. This has the advantage that, on account of the water-soluble and hygroscopic properties of propylene glycols, a water budget in the carbon dioxide segregation apparatus is more easily controllable. As a variant, however, it is also possible that the liquid does not contain any propylene glycol.

As an alternative to these variants, it is also possible that the carbon dioxide segregation apparatus does not contain any liquid.

The twin facade arrangement preferably comprises a particle filter for filtering aerosol particles out of the air stream. This has the advantage that soot and dirt, and also fine particles that are generated by road traffic, for example, can be filtered out of the air.

In a preferred variant thereof, the particle filter for filtering aerosol particles out of the air stream is disposed upstream of the carbon dioxide segregation apparatus viewed in air flow direction. This has the advantage that the maintenance expenditure for the carbon dioxide segregation apparatus is reduced. Alternatively, however, it is also possible that the particle filter is disposed only downstream of the carbon dioxide segregation apparatus.

In a particularly preferred variant, the particle filter is disposed upstream of the air inlet or within the air inlet viewed in air flow direction. In a preferred variant thereof, the particle filter, by contrast, is disposed in the facade interspace downstream of the air inlet but beneath a middle of the twin facade between the air inlet and the air outlet in air flow direction. In both variants, the advantage is achieved that less soot, dirt and fine particles get into the facade interspace, which reduces the maintenance expenditure for the twin facade.

As an alternative to these variants, however, it is also possible that the twin facade arrangement does not have any such particle filter for filtering aerosol particles out of the air stream.

In order to generate the vertically directed air stream by chimney effect, preferably either a temperature $T_1$ of the air stream in a region of the air inlet and hence in a lower region of the facade interspace is greater than a temperature $T_2$ of the air stream in a region of the air outlet and hence in an upper region of the facade interspace or the temperature $T_1$ of the air stream in the region of the air inlet is the same as the temperature $T_2$ of the air stream in the region of the air outlet, where the temperature $T_1$ of the air stream in the region of the air inlet and the temperature $T_2$ of the air stream in the region of the air outlet is greater than a temperature $T_U$ of the air in the environment of the above-ground construction and hence the ambient air. In the first case, the vertically directed air stream is additionally boosted when the temperature $T_1$ of the air stream in the region of the air inlet is additionally greater than the temperature $T_U$ of the air in the environment of the above-ground construction and hence the ambient air. Moreover, in the first case, the vertically directed air stream is boosted when the temperature $T_2$ of the air stream in the region of the air outlet is greater than the temperature $T_U$ of the air from the environment of the above-ground construction and hence the ambient air. These temperature relations have the advantage that the chimney effect can be generated and maintained in an optimal manner, such that the vertically directed air stream is generated and maintained. In order to achieve the temperature relations described, different preferred features of the twin facade arrangement are described hereinafter.

Advantageously, the outer facade is a glass facade and hence comprises outer facade glass. This means that preferably at least 70%, more preferably at least 80%, most preferably at least 90%, of a surface of the outer facade is formed by outer facade glass. By virtue of the outer facade being a glass facade, the advantage is achieved that the chimney effect for generation of the vertically directed air stream can be achieved and maintained very efficiently by insolation in a simple manner.

Alternatively, however, it is also possible that the outer facade is not a glass facade. For example, less than 70% of the surface of the outer facade may be formed by outer facade glass, or the outer facade may also be entirely devoid of outer facade glass. The latter may be the case, for example, when the above-ground construction is a silo, a bridge support or a bridge pier.

If the outer facade is a glass facade and hence comprises outer facade glass, preferably at least 50% of the outer facade glass beneath a middle of the twin facade between the air inlet and the air outlet is clear glass. This middle of the twin facade mentioned repeatedly in the present text is not necessarily the geometric middle of the twin facade. Instead, the middle of the twin facade mentioned in the present text, viewed in vertical direction, is at half the distance between the air inlet and the air outlet. Thus, the position of the middle of the twin facade as intended here depends on the position of the air inlet and the air outlet and may thus be above or below the geometric middle of the twin facade or else specifically at the geometric middle of the twin facade.

The clear glass mentioned here is a glass in which low-iron oxide raw materials are melted into the material matrix in order to increase the light transparency of the glass and the transparency of the glass to thermal radiation. The clear glass here preferably has an iron oxide content of less than 200 ppm. This clear glass is preferably a float glass. The clear glass has thus preferably been produced in a float process or else float glass method. This is a continuous process in which liquid glass melt is guided continually from one end onto a bath of liquid tin, on which the glass floats. In one variant for this purpose, however, the clear glass may also have been produced by a different method.

If the outer facade glass beneath the middle of the twin facade between the air inlet and the air outlet has at least 50% clear glass, the effect is achieved that more solar radiation gets into the facade interspace and to the inner facade beneath the middle of the twin facade. As a result, air present in the facade interspace beneath the middle of the twin facade is more strongly heated on insolation, which means that the temperature $T_1$ of the air is increased in a region of the air inlet. This has the advantage that the chimney effect and hence the air flow is boosted.

As an alternative, it is also possible that the outer facade glass beneath the middle of the twin facade between the air inlet and the air outlet has less than 50% clear glass. This also includes a variant in which the outer facade glass beneath the middle of the twin facade between the air inlet and the air outlet does not include any clear glass.

Advantageously, above the middle of the twin facade between the air inlet and the air outlet, at least 10%, more preferably at least 50% of the outer facade glass is solar radiation-absorbing and/or solar radiation-reflecting. Solar radiation-absorbing glass or outer facade glass may, for example, have an elevated iron oxide content. Preferably, the iron oxide content of solar radiation-absorbing glass or outer facade glass is in the range from 0.2 percent by weight to 1.0 percent by weight. The iron oxide content of solar radiation-absorbing glass or outer facade glass may alternatively be equal to 1.0 percent by weight or greater. Together with an elevated iron oxide content or instead of an elevated iron oxide content, solar radiation-absorbing glass or outer facade glass may, for example, also have at least two layers having a solar radiation-absorbing interlayer disposed between the at least two layers. Solar radiation-reflecting glass or outer facade glass may, for example, have at least two layers having a solar radiation-reflecting interlayer disposed between the at least two layers.

Alternatively, however, it is also possible that less than 10% of the outer facade glass above the middle of the twin facade between the air inlet and the air outlet is solar radiation-absorbing and/or solar radiation-reflecting.

Irrespective of how the solar radiation-absorbing or solar radiation-reflecting properties of the outer facade glass have been achieved, the advantage is achieved in this way that less solar radiation can get into the facade interspace and to the inner facade above the middle of the twin facade between the air inlet and the air outlet. As a result, air present in the facade interspace above the middle of the twin facade is heated to a lesser degree on insolation. This means that the temperature $T_2$ of the air in a region of the air outlet is reduced or less significantly heated. This has the advantage that the chimney effect and hence the air flow is boosted.

If at least 10%, more preferably at least 50%, of the outer facade glass above the middle of the twin facade between the air inlet and the air outlet has at least two layers with a solar radiation-absorbing and/or solar radiation-reflecting interlayer disposed between the at least two layers, this interlayer, in a preferred variant, is an electrochromic interlayer and is solar radiation-absorbing and/or solar radiation-reflecting. In the case of a solar radiation-absorbing, electrochromic interlayer, the color and hence the transparency of the interlayer may be altered by applying an electrical voltage. Such an interlayer may be manufactured, for example, from tungsten trioxide or polyaniline. In the case of a solar radiation-reflecting, electrochromic interlayer, the reflection of solar radiation and hence the transparency of the interlayer may be altered by applying an electrical voltage.

If the interlayer is an electrochromic interlayer, the advantage is achieved that, by applying an electrical voltage to the interlayer, it is possible to control how much insolation gets into the facade interspace. Accordingly, this can influence the temperature $T_2$ of the air in a region of the air outlet, by means of which it is possible to control the strength of the chimney effect and hence of the air stream.

If at least 10%, more preferably at least 50% of the outer facade glass above the middle of the twin facade between the air inlet and the air outlet has at least two layers having a solar radiation-absorbing and/or solar radiation-reflecting interlayer disposed between the at least two layers, this interlayer, in a further preferred variant, is a thermochromic interlayer and is solar radiation-absorbing and/or solar radiation-reflecting. In the case of a solar radiation-absorbing, thermochromic interlayer, the absorption of solar radiation preferably increases with increasing interlayer temperature. In the case of a solar radiation-reflecting, thermochromic interlayer, the reflection of solar radiation preferably increases with increasing interlayer temperature.

If the interlayer is such a thermochromic interlayer, the advantage is achieved that less solar radiation gets into the facade interspace in the event of relatively strong solar radiation. Accordingly, as a result, the temperature $T_2$ of the air in a region of the air outlet is increased to a proportionally lesser degree in the event of relatively strong solar radiation, whereas the temperature $T_2$ is increased to a proportionally greater degree in the event of lower insolation. Accordingly, this achieves self-regulation of the chimney effect and hence of the air stream.

As an alternative to these variants, it is also possible, however, that there is not at least 10% of the outer facade glass above the middle of the twin facade between the air inlet and the air outlet that is solar radiation-absorbing and/or solar radiation-reflecting.

Preferably, at least 10%, more preferably at least 50%, of the outer facade glass above the middle of the twin facade between the air inlet and the air outlet has an outer facade glass coating, in which case the outer facade glass coating is solar radiation-absorbing and/or solar radiation-reflecting.

Such a solar radiation-absorbing and/or solar radiation-reflecting outer facade glass coating above the middle of the twin facade between the air inlet and the air outlet has the advantage that less solar radiation can get into the facade interspace and to the inner facade above the middle of the outer facade between the air inlet and the air outlet. As a result, air present in the facade interspace above this middle of the outer facade is heated to a lesser degree on insolation, which means that the temperature $T_2$ of the air in a region of the air outlet is reduced or less significantly heated. This has the advantage that the chimney effect and hence the air flow is boosted.

In a preferred variant, at least 10%, more preferably at least 50%, of the outer facade glass above the middle of the twin facade between the air inlet and the air outlet has an outer facade glass coating which is an electrochromic coating and is solar radiation-absorbing and/or solar radiation-reflecting. In the case of a solar radiation-absorbing, electrochromic outer facade glass coating, the color and hence the transparency of the outer facade glass coating may be altered by applying an electrical voltage. Such an outer facade glass coating may be manufactured, for example, from tungsten trioxide or polyaniline. In the case of a solar radiation-reflecting, electrochromic outer facade glass coating, the reflection of solar radiation and hence the transparency of the outer facade glass coating may be altered by applying an electrical voltage.

If the outer facade glass coating is an electrochromic coating, the advantage is achieved that, by applying an electrical voltage to the outer facade glass coating, it is possible to control how much solar radiation gets into the facade interspace. Accordingly, this can influence the temperature $T_2$ of the air in a region of the air outlet, by means of which it is possible to control the strength of the chimney effect and hence of the air stream.

In a further preferred variant, at least 10%, more preferably at least 50%, of the outer facade glass above the middle of the twin facade between the air inlet and the air outlet has an outer facade glass coating which is a thermochromic coating and is solar radiation-absorbing and/or solar radiation-reflecting. In the case of a solar radiation-absorbing, thermochromic outer facade glass coating, the absorption of solar radiation preferably increases with increasing temperature of the outer facade glass coating. In the case of a solar radiation-reflecting, thermochromic outer facade glass coating, the reflection of solar radiation preferably increases with increasing temperature of the outer facade glass coating.

If the outer facade glass coating is a thermochromic coating, the advantage is achieved that less solar radiation gets into the facade interspace in the event of relatively strong solar radiation. Accordingly, as a result, the temperature $T_2$ of the air in a region of the air outlet is increased to a lesser degree in the event of relatively strong solar radiation, whereas the temperature $T_2$ is heated to a greater degree in the event of lower insolation. Accordingly, this achieves self-regulation of the chimney effect and hence of the air stream.

If the outer facade glass has a solar radiation-absorbing and/or solar radiation-reflecting outer facade glass coating, it is immaterial how this outer facade glass coating has been applied to the outer facade glass. For instance, the coating may have been effected by a chemical or physical process. For example, the coating may have been effected by a pyrolytic coating method, by a PVD coating method, for example a magnetron sputtering coating method, by a CVD coating method, by a plasma-assisted coating method, or by painting, printing, laminating with a foil or a combination of these methods. Particularly advantageous here is an outer facade glass coating applied by means of magnetron sputtering methods, because this method enables very efficient and inexpensive coating over a large area.

Alternatively, however, it is also possible that there is not at least 10% of the outer facade glass above the middle of the twin facade between the air inlet and the air outlet that has a solar radiation-absorbing and/or solar radiation-reflecting outer facade glass coating. This also includes a variant in which the outer facade glass above the middle of the twin facade between the air inlet and the air outlet does not have any solar radiation-absorbing or solar radiation-reflecting outer facade glass coating at all.

Advantageously, the inner facade comprises inner facade glass, with a surface of the inner facade facing the facade interspace being formed from inner facade glass at least to an extent of 30%, preferably at least to an extent of 50%, more preferably at least to an extent of 70%. It is also possible here for the surface area of the inner facade facing the facade interspace to be formed from 100% inner facade glass. If the surface area of the inner facade facing the facade interspace is not formed from 100% inner facade glass, it is immaterial which materials are used to form the proportion of the surface area not formed by inner facade glass. For instance, this proportion may be formed from one or more other materials, for example concrete, stone, brick, metal, fiber materials made of material weaves, such as glass fibers, or material composites made of plastic together with other building materials.

If the surface area of the inner facade facing the facade interspace is formed from inner facade glass at least to an extent of 30%, at least to an extent of 50%, at least to an extent of 70% or even to an extent of 100%, the advantage is achieved that sufficient daylight can get into the interior of the above-ground construction. It is possible here to adjust the proportion of daylight that gets into the interior of the above-ground construction according to the end use. The greater the proportion of inner facade glass, the more daylight can get into the interior of the above-ground construction.

As an alternative, it is also possible that the surface area of the inner facade facing the facade interspace is formed from inner facade glass to an extent of less than 30% or does not comprise any inner facade glass at all. The latter may be the case, for example, when the above-ground construction is a silo, a bridge support or a bridge pier.

If the inner facade comprises inner facade glass, advantageously at least 10%, more preferably at least 50%, of the inner facade glass beneath the middle of the twin facade between the air inlet and the air outlet is solar radiation-absorbing and/or solar radiation-reflecting. Solar radiation-absorbing glass or inner facade glass may, for example, have an elevated iron oxide content. Preferably, the iron oxide content of solar radiation-absorbing glass or inner facade glass is in the range from 0.2 percent by weight to 1.0 percent by weight. But the iron oxide content of solar radiation-absorbing glass or inner facade glass may also be equal to 1.0 percent by weight or greater. Together with an elevated iron oxide content or instead of an elevated iron oxide content, solar radiation-absorbing glass or inner facade glass may, for example, also have at least two layers with a solar radiation-absorbing interlayer disposed between the at least two layers. Solar radiation-reflecting glass or inner facade glass may, for example, have at least two layers with a solar radiation-reflecting interlayer disposed between the at least two layers.

Irrespective of how the solar radiation-absorbing or solar radiation-reflecting properties of the inner facade glass have been achieved, this achieves the effect that, below this middle of the twin facade, the inner facade glass is more strongly heated on account of the absorption of solar radiation and more solar rays are reflected back into the facade interspace on account of the elevated reflection of solar radiation and hence run through the facade interspace for a second time. Both have the effect that air present in the facade interspace below this middle of the twin facade is more strongly heated on insolation. This increases the temperature $T_1$ of the air in a region of the air inlet. This has the advantage that the chimney effect and hence the air flow is boosted.

If at least 10%, more preferably at least 50%, of the outer facade glass beneath the middle of the twin facade between the air inlet and the air outlet has at least two layers with a solar radiation-absorbing and/or solar radiation-reflecting interlayer disposed between the at least two layers, this interlayer, in a preferred variant, is an electrochromic interlayer and is solar radiation-absorbing and/or solar radiation-reflecting. In the case of a solar radiation-absorbing, electrochromic interlayer the color and hence the transparency of the interlayer may be altered by applying an electrical voltage. Such an interlayer may be manufactured, for example, from tungsten trioxide or polyaniline. In the case of a solar radiation-reflecting, electrochromic interlayer, the reflection of solar radiation and hence the transparency of the interlayer may be altered by applying an electrical voltage.

If the interlayer is an electrochromic interlayer, the advantage is achieved that, by applying an electrical voltage to the interlayer, it is possible to control how strongly the inner facade glass beneath the middle of the twin facade is heated on account of the absorption of solar radiation, and how much solar radiation is reflected back into the facade interspace on account of the elevated reflection of solar radiation. Since both the elevated absorption of solar radiation and the elevated reflection of solar radiation have the effect that air present in the facade interspace beneath the middle of the twin facade is more strongly heated on insolation, it is thus possible due to the electrochromic interlayer to influence the temperature $T_1$ of the air in a region of the air inlet, by means of which it is possible to control the strength of the chimney effect and hence of the air stream.

If at least 10%, more preferably at least 50%, of the inner facade glass beneath the middle of the twin facade between the air inlet and the air outlet has at least two layers with a solar radiation-absorbing and/or solar radiation-reflecting interlayer disposed between the at least two layers, this interlayer, in a further preferred variant, is a thermochromic interlayer and is solar radiation-absorbing and/or solar radiation-reflecting. In the case of a solar radiation-absorbing, thermochromic interlayer, the absorption of solar radiation preferably decreases with increasing interlayer temperature. In the case of a solar radiation-reflecting, thermochromic interlayer, the reflection of solar radiation preferably decreases with increasing interlayer temperature.

If the interlayer is such a thermochromic interlayer, the advantage is achieved that, in the event of relatively strong solar radiation, the inner facade glass with the interlayer is heated to a lesser degree on account of the reduced absorption of solar radiation, and that less solar radiation is reflected back into the facade interspace on account of the reduced reflection of solar radiation. Accordingly, as a result, the temperature $T_1$ of the air in a region of the air inlet is increased to a proportionally lesser degree in the event of relatively strong solar radiation, whereas the temperature $T_1$ is increased to a proportionally greater degree in the event of lower insolation. Accordingly, this achieves self-regulation of the chimney effect and hence of the air stream.

As an alternative to these variants, it is also possible that there is not at least 10% of the inner facade glass beneath the middle of the twin facade between the air inlet and the air outlet that is solar radiation-absorbing and/or solar radiation-reflecting.

Preferably, at least 10%, more preferably at least 50%, of the inner facade glass beneath the middle of the twin facade between the air inlet and the air outlet has an inner facade glass coating, with the inner facade glass coating being solar radiation-absorbing and/or solar radiation-reflecting.

Such a solar radiation-absorbing and/or solar radiation-reflecting inner facade glass coating beneath the middle of the twin facade between the air inlet and the air outlet has the effect that the inner facade glass beneath the middle of the twin facade is more strongly heated on account of the absorption of solar radiation and more solar rays run through the facade interspace on account of the elevated reflection of solar radiation. This has the effect that air present in the facade interspace below this middle of the twin facade is more strongly heated on insolation, which means that the temperature $T_1$ of the air in a region of the air inlet is increased. This has the advantage that the chimney effect and hence the air flow is boosted.

In a preferred variant, at least 10%, more preferably at least 50%, of the inner facade glass beneath the middle of the twin facade between the air inlet and the air outlet has an inner facade glass coating which is an electrochromic coating and is solar radiation-absorbing and/or solar radiation-reflecting. In the case of a solar radiation-absorbing, electrochromic inner facade coating, the color and hence the transparency of the inner facade coating may be altered by applying an electrical voltage. Such an inner facade coating may be manufactured, for example, from tungsten trioxide or polyaniline. In the case of a solar radiation-reflecting, electrochromic inner facade coating, the reflection of solar radiation and hence the transparency of the inner facade coating may be altered by applying an electrical voltage.

If the inner facade glass coating is an electrochromic coating, the advantage is achieved that, by applying an electrical voltage to the interlayer, it is possible to control the extent to which the inner facade glass beneath the middle of the twin facade is heated on account of the absorption of solar radiation or how much solar radiation is reflected back into the facade interspace on account of the elevated reflection of solar radiation. Since both the elevated absorption of solar radiation and the elevated reflection of solar radiation have the effect that air present in the facade interspace beneath the middle of the twin facade is more strongly heated on insolation, it is thus possible due to the electrochromic inner facade glass coating to influence the temperature $T_1$ of the air in a region of the air inlet, by means of which it is possible to control the strength of the chimney effect and hence of the air stream.

In a further preferred variant, at least 10%, more preferably at least 50%, of the inner facade glass beneath the middle of the twin facade between the air inlet and the air outlet has an inner facade glass coating which is a thermochromic coating and is solar radiation-absorbing and/or solar radiation-reflecting. In the case of a solar radiation-absorbing, thermochromic inner facade coating, the absorption of solar radiation preferably decreases with increasing temperature of the inner facade coating. In the case of a solar radiation-reflecting, thermochromic inner facade coating, the reflection of solar radiation preferably decreases with increasing temperature of the inner facade coating.

If the inner facade glass coating is such a thermochromic coating, the advantage is achieved that, in the event of relatively strong solar radiation, the inner facade glass with the coating is heated to a lesser degree on account of the reduced absorption of solar radiation, and that less solar radiation is reflected back into the facade interspace on account of the reduced reflection of solar radiation. Accordingly, as a result, the temperature $T_1$ of the air in a region of the air inlet is increased to a proportionally lesser degree in the event of relatively strong solar radiation, whereas the temperature $T_1$ is increased to a proportionally greater degree in the event of lower insolation. Accordingly, this achieves self-regulation of the chimney effect and hence of the air stream.

If the inner facade glass has a solar radiation-absorbing and/or solar radiation-reflecting inner facade glass coating, it is immaterial how this inner facade glass coating has been applied to the inner facade glass. For instance, the coating may have been effected by a chemical or physical process. For example, the coating may have been effected by a pyrolytic coating method, by a PVD coating method, for example a magnetron sputtering coating method, by a CVD coating method, by a plasma-assisted coating method, or by painting, printing, laminating with a foil or a combination of these methods. Particularly advantageous here is an inner facade glass coating applied by means of magnetron sputtering methods, because this method enables very efficient and inexpensive coating over a large area.

Alternatively, however, it is also possible that there is not at least 10% of the inner facade glass beneath the middle of the twin facade between the air inlet and the air outlet that has a solar radiation-absorbing and/or solar radiation-reflecting inner facade glass coating. This also includes a variant in which the inner facade glass does not have any solar radiation-absorbing or solar radiation-reflecting inner facade glass coating at all beneath the middle of the twin facade between the air inlet and the air outlet.

Advantageously, the twin facade comprises an intermediate facade for guiding of the air stream in the facade interspace on the outside and inside of the intermediate facade which is disposed in the facade interspace between the outer facade and the inner facade. Such an intermediate facade has the advantage that the temperature of the air of the air stream can be controlled within the facade interspace in order to optimally generate and maintain the chimney effect. It is immaterial here how the intermediate facade is formed. For example, the intermediate facade may comprise intermediate facade glass. In a further example, the intermediate facade is formed by a mechanical, adjustable shade system, especially shutters and/or blinds. Moreover, the intermediate facade may, for example, also comprise the shade system and intermediate facade glass.

Advantageously, the intermediate facade comprises intermediate facade glass, with a surface of the intermediate facade being formed at least to an extent of 30%, preferably at least to an extent of 50%, more preferably at least to an extent of 70%, from intermediate facade glass. It is possible here for the surface of the intermediate facade facing the facade interspace also to be formed from 100% intermediate facade glass. If the surface of the intermediate facade is not formed from 100% intermediate facade glass, it is immaterial which materials are used to form the proportion of the surface not formed from intermediate facade glass. For instance, this proportion may be formed from one or more other materials, for example concrete, stone, brick, metal, fiber materials made of material weaves, such as glass fibers, or material composites composed of plastic together with other building materials.

If the surface of the intermediate facade is formed at least to an extent of 30%, at least to an extent of 50%, at least to an extent of 70% or even to an extent of 100% from intermediate facade glass, the advantage is achieved that sufficient daylight can get into the inner facade and, as the case may be, into the interior of the above-ground construction. The proportion of daylight that gets into the inner facade and, as the case may be, into the interior of the above-ground construction may be adjusted according to the end use. The greater the proportion of intermediate facade glass, the more daylight can get into the inner facade and, as the case may be, into the interior of the above-ground construction.

As an alternative, it is also possible that the surface of the inner facade is formed to an extent of less than 30% from inner facade glass or does not include any inner facade glass at all. The latter may be the case, for example, when the above-ground construction is a silo, a bridge support or a bridge pier.

As an alternative to these variants, however, it is also possible that the twin facade does not comprise an intermediate facade disposed in the facade interspace.

If the intermediate facade comprises intermediate facade glass, advantageously at least 10%, more preferably at least 50%, of the intermediate facade glass beneath the middle of the twin facade between the air inlet and the air outlet is solar radiation-absorbing and/or solar radiation-reflecting. Solar radiation-absorbing glass or intermediate facade glass may, for example, have an elevated iron oxide content. The iron oxide content of solar radiation-absorbing glass or inner facade glass is preferably in the range from 0.2 percent by weight to 1.0 percent by weight. But the iron oxide content of solar radiation-absorbing glass or intermediate facade glass may also be equal to 1.0 percent by weight or greater. Together with an elevated iron oxide content or instead of an elevated iron oxide content, solar radiation-absorbing glass or intermediate facade glass may, for example, also have at least two layers with a solar radiation-absorbing interlayer disposed between the at least two layers. Solar radiation-reflecting glass or intermediate facade glass may, for example, have at least two layers with a solar radiation-reflecting interlayer disposed between the at least two layers.

Irrespective of how the solar radiation-absorbing or solar radiation-reflecting properties of the intermediate facade glass have been achieved, this achieves the effect that the intermediate facade glass below this middle of the twin facade is heated to a greater degree on account of the absorption of solar radiation and more solar rays are reflected back into the interspace between the intermediate facade and the outer facade on account of the elevated reflection of solar radiation and hence run through the interspace for a second time. Both of these have the effect that air present in the facade interspace below this middle of the twin facade is more strongly heated on insolation. This increases the temperature $T_1$ of the air in a region of the air inlet. This has the advantage that the chimney effect and hence the air flow is boosted.

If at least 10%, more preferably at least 50%, of the intermediate facade glass beneath the middle of the twin facade between the air inlet and the air outlet has at least two layers with a solar radiation-absorbing and/or solar radiation-reflecting interlayer disposed between the at least two layers, this interlayer, in a preferred variant, is an electrochromic interlayer and is solar radiation-absorbing and/or solar radiation-reflecting. In the case of a solar radiation-absorbing, electrochromic interlayer, the color and hence the transparency of the interlayer may be altered by applying an electrical voltage. Such an interlayer may be manufactured, for example, from tungsten trioxide or polyaniline. In the case of a solar radiation-reflecting, electrochromic interlayer, the reflection of solar radiation and hence the transparency of the interlayer may be altered by applying an electrical voltage.

If the interlayer is an electrochromic interlayer, the advantage is achieved that, by applying an electrical voltage to the interlayer, it is possible to control the extent to which the intermediate facade glass beneath the middle of the twin facade is heated on account of the absorption of solar radiation and how much solar radiation is reflected back into the facade interspace on account of the elevated reflection of solar radiation. Since both the elevated absorption of solar radiation and the elevated reflection of solar radiation have the effect that air present in the facade interspace beneath the middle of the twin facade is more strongly heated on insolation, it is thus possible due to the electrochromic interlayer to influence the temperature $T_1$ of the air in a region of the air inlet, by means of which it is possible to control the strength of the chimney effect and hence of the air stream.

If at least 10%, more preferably at least 50% of the intermediate facade glass beneath the middle of the twin facade between the air inlet and the air outlet has at least two layers with a solar radiation-absorbing and/or solar radiation-reflecting interlayer disposed between the at least two layers, this interlayer, in a further preferred variant, is a thermochromic interlayer and is solar radiation-absorbing and/or solar radiation-reflecting. In the case of a solar radiation-absorbing, thermochromic interlayer, the absorption of solar radiation preferably decreases with increasing interlayer temperature. In the case of a solar radiation-reflecting, thermochromic interlayer, the reflection of solar radiation preferably decreases with increasing interlayer temperature.

If the interlayer is such a thermochromic interlayer, the advantage is achieved that the intermediate facade glass with the interlayer, in the case of relatively strong solar radiation, is heated to a lesser degree on account of the reduced absorption of solar radiation and that less solar radiation is reflected back into the interspace between the intermediate facade and the outer facade on account of the reduced reflection of solar radiation. Accordingly, as a result, the temperature $T_1$ of the air in a region of the air inlet is increased to a proportionally lesser degree in the event of relatively strong solar radiation, whereas the temperature $T_1$ is increased to a proportionally greater degree in the case of lower insolation. Accordingly, this achieves self-regulation of the chimney effect and hence of the air stream.

As an alternative to these variants, it is also possible that there is not at least 10% of the intermediate facade glass beneath the middle of the twin facade between the air inlet and the air outlet that is solar radiation-absorbing and/or solar radiation-reflecting.

Preferably, at least 10%, more preferably at least 50%, of the intermediate facade glass beneath the middle of the twin facade between the air inlet and the air outlet has an intermediate facade glass coating, with the intermediate facade glass coating being solar radiation-absorbing and/or solar radiation-reflecting.

Such a solar radiation-absorbing and/or solar radiation-reflecting intermediate facade glass coating beneath the middle of the twin facade between the air inlet and the air outlet has the effect that, beneath the middle of the twin facade, the intermediate facade glass is heated to a greater degree on account of the absorption of solar radiation and more solar rays run through the interspace between the intermediate facade and the outer facade on account of the elevated reflection of solar radiation. This has the effect that air present in the facade interspace beneath this middle of the twin facade is more strongly heated on insolation, which means that the temperature $T_1$ of the air in a region of the air inlet is increased. This has the advantage that the chimney effect and hence the air flow is boosted.

In a preferred variant, at least 10%, more preferably at least 50% of the intermediate facade glass beneath the middle of the twin facade between the air inlet and the air outlet has an intermediate facade glass coating which is an electrochromic coating and is solar radiation-absorbing and/or solar radiation-reflecting. In the case of a solar radiation-absorbing, electrochromic intermediate facade coating, the color and hence the transparency of the intermediate facade coating may be altered by applying an electrical voltage. Such an intermediate facade coating may be manufactured, for example, from tungsten trioxide or polyaniline. In the case of a solar radiation-reflecting, electrochromic intermediate facade coating, the reflection of solar radiation and hence the transparency of the intermediate facade coating may be altered by applying an electrical voltage.

If the intermediate facade glass coating is an electrochromic coating, the advantage is achieved that, by applying an electrical voltage to the interlayer, it is possible to control the extent to which the intermediate facade glass beneath the middle of the twin facade is heated on account of the absorption of solar radiation and how much solar radiation is reflected back into the interspace between the intermediate facade and the outer facade on account of the elevated reflection of solar radiation. Since both the elevated absorption of solar radiation and the elevated reflection of solar radiation have the effect that air present in the facade interspace beneath the middle of the twin facade is more strongly heated on insolation, it is thus possible due to the electrochromic intermediate facade glass coating to influence the temperature $T_1$ of the air in a region of the air inlet, by means of which it is possible to control the strength of the chimney effect and hence of the air stream.

In a further preferred variant, at least 10%, more preferably at least 50%, of the intermediate facade glass beneath the middle of the twin facade between the air inlet and the air outlet has an intermediate facade glass coating which is a thermochromic coating and is solar radiation-absorbing and/or solar radiation-reflecting. In the case of a solar radiation-absorbing, thermochromic intermediate facade coating, the absorption of solar radiation preferably decreases with increasing temperature of the intermediate facade coating. In the case of a solar radiation-reflecting, thermochromic intermediate facade coating, the reflection of solar radiation preferably decreases with increasing temperature of the intermediate facade coating.

If the intermediate facade glass coating is such a thermochromic coating, the advantage is achieved that the intermediate facade glass with the coating, in the event of relatively strong solar radiation, is heated to a lesser degree on account of the reduced absorption of solar radiation and less solar radiation is reflected back into the interspace between the intermediate facade and the outer facade on account of the reduced reflection of solar radiation. Accordingly, as a result, the temperature $T_1$ of the air in a region of the air inlet is increased to a proportionally lesser degree in the event of relatively strong solar radiation, whereas the temperature $T_1$ is increased to a proportionally greater degree in the event of lower insolation. Accordingly, this achieves self-regulation of the chimney effect and hence of the air stream.

If the intermediate facade glass has a solar radiation-absorbing and/or solar radiation-reflecting intermediate facade glass coating, it is immaterial how this intermediate facade glass coating has been applied to the intermediate facade glass. For instance, the coating may have been effected by a chemical or physical process. For example, the coating may have been effected by a pyrolytic coating method, by a PVD coating method, for example a magnetron sputtering coating method, by a CVD coating method, by a plasma-assisted coating method, or by painting, printing, laminating with a foil or a combination of these methods. Particularly advantageous here is an intermediate facade glass coating applied by means of magnetron sputtering methods, because this method enables very efficient and inexpensive coating over a large area.

Alternatively, however, it is also possible that there is not at least 10% of the intermediate facade glass beneath the middle of the twin facade between the air inlet and the air outlet that has a solar radiation-absorbing and/or solar radiation-reflecting inner facade glass coating. This also includes a variant in which the intermediate facade glass does not have any solar radiation-absorbing or solar radiation-reflecting intermediate facade glass coating at all beneath the middle of the twin facade between the air inlet and the air outlet.

As an alternative to these variants, it is also possible that the twin facade does not include any intermediate facade.

Advantageously, the twin facade arrangement comprises a heating apparatus, especially a heat exchanger or a heat pump, for heating of the air stream in the facade interspace beneath the middle of the twin facade between the air inlet and the air outlet. Since this heating apparatus serves for heating of the air stream in the facade interspace beneath the middle of the twin facade between the air inlet and the air outlet, it may also be referred to as lower heating apparatus. It is not necessary here for the lower heating apparatus to be a heat exchanger or a heat pump. For instance, the lower heating apparatus may also work by a different principle. For example, the lower heating apparatus may be an electrical heating device or an oil- or gas-driven heating device.

Irrespective of the principle by which the lower heating apparatus works, the lower heating apparatus has the advantage that air present in the facade interspace beneath this middle of the twin facade can be heated if required. In this way, if required, the temperature $T_1$ of the air in a region of the air inlet can be increased and the chimney effect and hence the air stream can be boosted. Accordingly, this enables active control of the chimney effect and hence of the air stream.

If the lower heating apparatus is a heat exchanger or a heat pump, a fluid, especially air or water, from an interior of the above-ground construction preferably forms a reservoir for thermal energy, in which case this thermal energy can be used to heat the air stream with the heat exchanger or the heat pump. This has the advantage that it is possible by means of the fluid, or air or water, from the interior of the above-ground construction to cool the interior of the above-ground construction. This can be used for cooling of an apparatus in the above-ground construction or for climate control of the above-ground construction.

As an alternative to these variants, it is also possible that the twin facade arrangement does not comprise any such lower heating apparatus.

The twin facade arrangement preferably comprises a temperature control apparatus, especially a heat exchanger or a heat pump, for cooling and/or heating of the air stream in the facade interspace above the middle of the twin facade between the air inlet and the air outlet.

In the case of a heat exchanger or a heat pump as temperature control apparatus, a fluid from the interior of the above-ground construction preferably forms a sink or a reservoir for thermal energy, by means of which the air stream can be cooled or heated with the heat exchanger or the heat pump. If the air stream can be cooled with the temperature control apparatus, the fluid, on account of the thermal energy supplied to the fluid in the cooling of the air stream, is preferably usable for heating of the interior of the above-ground construction. If the air stream is heatable with the temperature control apparatus, the fluid, on account of the thermal energy removed from the fluid in the course of heating of the air stream, is preferably usable for cooling of the interior of the above-ground construction. In both cases, the fluid from the interior of the above-ground construction is preferably air or water.

Irrespective of whether or not the temperature control apparatus is a heat exchanger or a heat pump, the temperature control apparatus has the advantage that it enables active control of the chimney effect and hence of the air stream. If the temperature control device is suitable for cooling of the air stream in the facade interspace above the middle of the twin facade between the air inlet and the air outlet, the advantage is achieved that the air present in the facade interspace above this middle of the outer facade can be cooled if required, which means that the temperature $T_2$ of the air in the region of the air outlet is reduced. If the temperature $T_2$ of the air in the region of the air outlet is still greater than the temperature $T_U$ of the ambient air, it is possible in this way to boost the chimney effect and hence the air stream by increasing the temperature difference between the temperature $T_1$ of the air in the region of the air inlet and the temperature $T_2$ in the region of the air outlet.

If the temperature control apparatus is suitable for heating of the air stream in the facade interspace above the middle of the twin facade between the air inlet and the air outlet, the advantage is achieved that the air present in the facade interspace above this middle of the outer facade can be heated if required, which means that the temperature $T_2$ of the air in a region of the air outlet is increased. This can ensure that the temperature $T_2$ of the air in the region of the air outlet is greater than the temperature $T_U$ of the ambient air, which means that the chimney effect and the air stream can be maintained in a simple manner.

If the temperature control apparatus is suitable both for cooling and for heating of the air stream in the facade interspace above the middle of the twin facade between the air inlet and the air outlet, both the aforementioned advantages can be achieved.

As an alternative to these variants, however, it is also possible that the twin facade arrangement does not comprise any such temperature control apparatus.

The twin facade arrangement preferably comprises a propeller apparatus with a propeller disposed in the facade interspace for prevention of any flow directed downward and hence for formation of a flow of the air stream directed vertically upward by controlling a flow resistance of the propeller. This has the advantage that it is possible to achieve more uniform flow of the air stream. It is not necessary here that electrical energy can be generated with the propeller apparatus. Instead, the propeller has a torque that has to be overcome by the flow energy of the air for the air to be able to flow down past the propeller. The propeller apparatus here may have a drive in order to set the propeller in motion and hence to initially generate the propeller torque.

Alternatively, it is also possible that the twin facade arrangement does not have any such propeller apparatus.

Advantageously, the twin facade arrangement comprises at least a flap and/or at least a slide vane for regulation of the air stream. This has the advantage that a strength of the air stream can be controlled in an optimal manner. In addition, at least such a flap and/or at least such a slide vane can also be utilized for fresh air supply to the above-ground construction or for removal of waste air from the above-ground construction.

Alternatively, it is also possible that the twin facade arrangement does not comprise any flap or any slide vane for regulation of the air stream.

The twin facade arrangement preferably comprises a mechanical, adjustable shade system, especially shutters and/or blinds. This has the advantage that it is possible to control the amount of insolation that gets into the facade interspace, which makes it possible to control the strength of the air stream. In addition, it is also possible in this way, if required, to protect the interior of the above-ground construction from direct insolation. In order to gain these advantages, it is immaterial whether the shade system works purely mechanically or whether the shade system has one or more electrical drives and if necessary an electrical controller. In addition, it is immaterial whether the shade system is part of an intermediate facade, forms an intermediate facade or is disposed on the inner facade or on the outer facade.

Alternatively, it is also possible that the twin facade arrangement does not comprise any such mechanical shade system.

The twin facade arrangement, in the region of the air outlet, preferably has a draft booster in order to actively boost the air stream. The draft booster can more preferably be driven by wind in the ambient air. This has the advantage that the air current can be kept constant.

Alternatively, however, it is also possible that the twin facade arrangement does not have any such draft booster.

Advantageously, the twin facade arrangement comprises a turbine with a turbine wheel disposed in the facade interspace for generating electrical energy. This has the advantage that it is also possible to generate electrical energy in a simple manner with the air stream.

Alternatively, however, it is also possible that the twin facade arrangement does not comprise any such turbine.

The twin facade arrangement preferably comprises at least one photovoltaic module for generation of electrical energy. This at least one photovoltaic module is preferably disposed on the outer facade. Alternatively, however, it is also possible that the at least one photovoltaic module is disposed in the facade interspace, on the inner facade or at another position in the above-ground construction.

Alternatively, however, it is also possible that the twin facade arrangement does not have any photovoltaic module for generation of electrical energy.

If the twin facade arrangement has a turbine with a turbine wheel disposed in the facade interspace for generation of electrical energy and/or at least one photovoltaic module for generation of electrical energy, this has the advantage that this electrical energy can be used to drive and/or control elements of the twin facade arrangement. Such elements are slide vanes and/or flaps, the draft booster, the lower heating apparatus, the temperature control apparatus, the mechanical, adjustable shade system, electrochromic coatings and electrochromic interlayers. In order to enable the use of the electrical energy for the drive or the control of such elements even at night and in the event of low solar radiation, the twin facade arrangement in this case preferably has a storage means for electrical energy, for example a battery.

Advantageously, in a proportion of at least 70% of an area of the twin facade, a distance between the outer facade and the inner facade has a value within a range from 30 cm to 150 cm, more preferably from 50 cm to 120 cm. This has the advantage that the facade interspace is sufficiently broad for the air stream to be able to be generated and maintained by chimney effect, and for the air stream to be sufficiently strong that the carbon dioxide segregation apparatus receives sufficient air supplied by the air stream to segregate at least a portion of the carbon dioxide from this air. At the same time, this has the advantage that the facade interspace is not too broad, such that the twin facade does not take up too much space around the above-ground construction, and such that people in the interior of the above-ground construction do not feel isolated from the environment of the above-ground construction by the twin facade.

Alternatively, it is also possible that there is not a distance between the outer facade and the inner facade and hence a dimension of the facade interspace within a range from 30 cm to 150 cm in at least 70% of an area of the twin facade.

The facade interspace is preferably in hyperbolic form and has a pinch point disposed between the air inlet and the air outlet, with decreasing distance between the outer facade and the inner facade both proceeding from the air inlet toward the pinch point and proceeding from the air outlet toward the pinch point. It is immaterial here whether both the outer facade and the inner facade is in hyperbolic form or whether just the outer facade or just the inner facade is in hyperbolic form. This has the advantage that the air stream is additionally boosted.

In the case of such a hyperbolically formed facade interspace, the distance between the outer facade and the inner facade in at least 70% of the area of the twin facade between the air inlet and the air outlet is preferably within a range from 30 cm to 150 cm, more preferably from 50 cm to 120 cm. This achieves the advantages of this distance between the outer facade and the inner facade that have already been mentioned.

However, it is also possible that the facade interspace is in hyperbolic form and that the distance between the outer facade and the inner facade is not within a range from 30 cm to 150 cm in at least 70% of the area of the twin facade between the air inlet and the air outlet.

As an alternative to these variants, it is also possible that the facade interspace is not in hyperbolic form. For example, the distance between the outer facade and the inner facade may be essentially constant between the air inlet and the air outlet. What this preferably means is that the distance between the outer facade and the inner facade in at least 70% of the area of the twin facade between the air inlet and the air outlet is the same.

In a first preferred variant, the air inlet is disposed directly on the twin facade at least two meters, preferably at least three meters, more preferably at least four meters, above a ground that surrounds the above-ground construction and directly adjoins the above-ground construction, and hence connects the environment of the above-ground construction to the facade interspace. This has the advantage that ambient air that passes through the air inlet into the facade interspace by way of the air stream contains less dust, dirt and aerosol particles formed by road traffic, for example. Accordingly, less dust, dirt and aerosol particles thus get into the facade interspace, which can lower the maintenance of the twin facade arrangement. This advantage increases with the distance by which the air inlet is disposed above the ground that surrounds the above-ground construction and directly adjoins the above-ground construction.

In a second preferred variant, the twin facade arrangement comprises an air conduit which is connected to the air inlet, with ambient air being guidable through the air conduit via the air inlet into the facade interspace, with the air conduit comprising an inlet that leads into the ground surrounding the above-ground construction and through which ambient air from the environment of the above-ground construction can be admitted into the air conduit. More preferably, this inlet is disposed in or alongside a road that runs past the above-ground construction in order to suck exhaust gases from the road traffic from the road downward into the ground and to guide it through the air conduit via the air inlet into the facade interspace of the twin facade for treatment with the carbon dioxide segregation apparatus. This has the advantage that dust, dirt, aerosol particles and exhaust gases, especially carbon dioxide, that are generated by road traffic can be sucked away directly and sent to the carbon dioxide segregation apparatus for segregation of the carbon dioxide. This reduces the exposure of pedestrians to air pollutants in the environment of the above-ground construction.

In a further variant, the air inlet is disposed directly on the twin facade less than two meters above a ground that surrounds the above-ground construction and directly adjoins the high-ground construction and hence connects the environment of the above-ground construction to the facade interspace.

In a further variant, the twin facade arrangement comprises an air conduit connected to the air inlet, with ambient air being guidable through the air conduit via the air inlet into the facade interspace, with the air conduit comprising an inlet through which ambient air from the environment of the above-ground construction can be admitted into the air conduit, with the inlet being disposed in a further above-ground construction disposed in the environment of the above-ground construction.

Advantageously, an above-ground construction, especially a building, a bridge support, a bridge pier or a noise barrier wall, comprises a twin facade arrangement of the invention.

In this above-ground construction, the air outlet of the twin facade arrangement is preferably connected to a building interior within the above-ground construction, in order to accommodate the air stream flowing out of the facade interspace through the air outlet and to cool it to a temperature $T_1$ less than the temperature $T_2$ of the air stream in the region of the air outlet. This has the advantage that, even if the temperature $T_2$ of the air stream in the region of the air outlet is lower than the temperature $T_U$ of the air in the environment of the above-ground construction, the chimney effect and hence the air stream can be achieved and maintained in an optimal manner.

The building interior is preferably thermally insulated. This means preferably that a wall immediately surrounding the building interior comprises an insulation layer. The thermal insulation can achieve the effect that the temperature $T_1$ in the building interior is lower than the temperature $T_2$ of the air stream in the region of the air outlet. This in turn can achieve the effect that an air pressure in the building interior is lower than an air pressure in an environment of the above-ground construction and hence of an ambient air. Accordingly, it is thus possible to achieve and maintain the chimney effect and hence the air stream in an optimal manner.

As an alternative to this, the building interior is not thermally insulated.

The above-ground construction preferably comprises a cooling apparatus with which the building interior is coolable. This can ensure that the temperature $T_1$ in the building interior is less than the temperature $T_2$ of the air stream in the region of the air outlet, which means that it is also possible to ensure that the air pressure in the building interior is less than the air pressure in the environment of the above-ground construction and hence of the ambient air. In order to reduce energy consumption of the cooling apparatus, the building interior is additionally preferably thermally insulated. Dispensing with the saving of energy consumption, the building interior may alternatively not be thermally insulated.

Alternatively, it is also possible that the above-ground construction does not comprise a cooling apparatus with which the building interior is coolable.

A volume of the building interior is preferably greater than a volume of the facade interspace. This has the advantage that adiabatic expansion of the air in the building interior is enabled, as a result of which the air in the building interior becomes cooler than in the facade interspace. Accordingly, it is thus possible to achieve a lower temperature $T_1$ in the building interior than the temperature $T_2$ of the air stream in the region of the air outlet. This can in turn achieve the effect that an air pressure in the building interior is less than an air pressure in an environment of the above-ground construction and hence of an ambient air. Accordingly, it is thus possible to achieve and maintain the chimney effect and hence the air stream in an optimal manner.

In one variant, however, it is also possible that the volume of the building interior is the same size as or smaller than the volume of the facade interspace.

As an alternative, the air outlet of the twin facade arrangement may also not be connected to a building interior within the above-ground construction, in order to accommodate the air stream flowing out of the facade interspace through the air outlet and to cool it to a temperature $T_1$ lower than the temperature $T_2$ of the air stream in the region of the air outlet.

Advantageously, a twin facade arrangement of the invention for generation of a vertically directed air stream by chimney effect and for segregation of carbon dioxide from the air of the air stream is used. In a preferred variant, for this purpose, an above-described above-ground construction, especially a building, a bridge support or a bridge pier, with a twin facade arrangement of the invention for generation of a vertically directed air stream by chimney effect and for segregation of carbon dioxide from the air of the air stream is used.

Further advantageous embodiments and combinations of features of the invention will be apparent from the detailed description that follows and the totality of the claims.

BRIEF DESCRIPTION OF THE DRAWINGS

The drawings used for elucidation of the working example show.

In principle, identical parts in the figures are given the same reference numerals.

WAYS OF EXECUTING THE INVENTION

Figure 1:
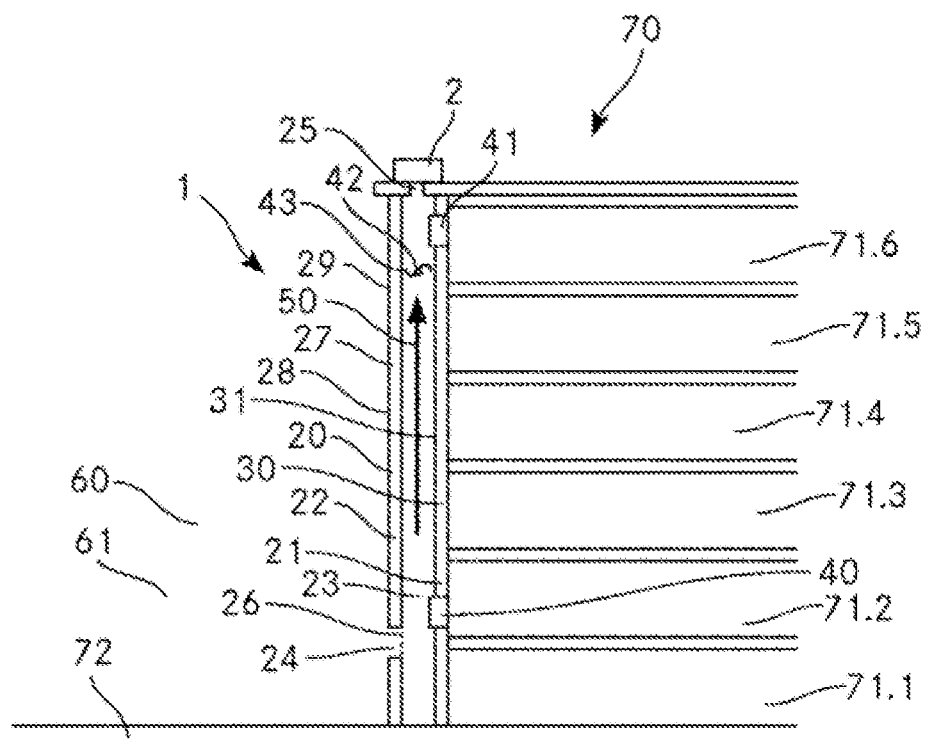
FIG. 1 a simplified schematic diagram of a cross section through an above-ground construction with a twin facade arrangement of the invention, FIG. 2 a simplified schematic diagram of a cross section through a further above-ground construction with a further twin facade arrangement of the invention, FIG. 3 a simplified schematic diagram of a cross section through a further above-ground construction with a further twin facade arrangement of the invention, FIG. 4 a simplified schematic diagram of a cross section through a further above-ground construction with a further twin facade arrangement of the invention, and FIG. 5a, b, c, d each a simplified schematic diagram of a cross section through a variant of a carbon dioxide segregation apparatus.

FIG. 1 shows a simplified schematic diagram of a cross section through an above-ground construction 70 having an inventive twin facade arrangement 1 having a twin facade 20 for generation of a vertically directed air stream 50 by chimney effect and a carbon dioxide segregation apparatus 2 for segregation of at least a portion of the carbon dioxide from the air of the air stream 50. The cross section shown is aligned vertically and at right angles to an outer surface of the twin facade 20 and runs through the twin facade 20. In addition, the cross section also shows part of an interior of the above-ground construction 70. However, the diagram does not show the full cross section through the entire above-ground construction 70, but ends on the right-hand side of FIG. 1 in the middle of the above-ground construction 100. The reason for this is that no further elements of the twin facade arrangement 1 are disposed in the middle of the above-ground construction 70 and hence a representation of this part of the above-ground construction 70 is superfluous.

In the present example, the above-ground construction 70 is a high-rise office building having six stories 101.1, . . . 101.6. The high-rise office building may alternatively have any other number of stories. Moreover, the above-ground construction 70 is not restricted to a high-rise office building. For instance, the above-ground construction 70 may also be a high-rise residential or hotel building. But it may equally also be an industrial building, a conference center, a stadium, a silo or any other building. It is also possible for the above-ground construction 70 to be a bridge pier or a bridge support.

Irrespective of the type of above-ground construction 70, the twin facade arrangement 1, as already mentioned, comprises the twin facade 20 for generation of the vertically directed air stream 50 by chimney effect and the carbon dioxide segregation apparatus 2 for segregation of at least a portion of the carbon dioxide from the air of the air stream 50. This carbon dioxide segregation apparatus 2 is simultaneously a nitrogen oxide segregation apparatus for segregation of at least a portion of the nitrogen oxides from the air of the air stream 50 and a sulfur oxide segregation apparatus for segregation of at least a portion of the sulfur oxides from the air of the air stream 50. The twin facade 20 comprises an inner facade 21 and an outer facade 22. Between this inner facade 21 and this outer facade 22 is a facade interspace 23 for guiding of the air stream 50. For this purpose, the inner facade 21 delimits the facade interspace 23 from the rest of the above-ground construction 70, while the outer facade 22 delimits the facade interspace 23 from an environment 60 of the above-ground construction 70. In a proportion of 70% of an area of the twin facade 20, a distance between the outer facade 22 and the inner facade 21 has a value of 100 cm. But this distance may also have other values. In illustrative variants, the distance is 31 cm, 45 cm, 50 cm, 120 cm, 130 cm or 150 cm.

The twin facade 20 further comprises an air inlet 24 for introduction of the air stream 50 with air from the environment 60 of the above-ground construction 70 and hence with ambient air 61 into the facade interspace 23. In order that not too much soot and dirt and fine particles get into the facade interspace 23 with the air stream 50, a particle filter 26 for filtering aerosol particles out of the air stream 50 is disposed in the air inlet 24.

In the present embodiment, the air inlet 24 in the outer facade 23 is disposed in the outer facade 22 two meters above a ground 72 that surrounds the above-ground construction 70 and directly adjoins the above-ground construction 70 and hence connects the environment 60 of the above-ground construction 70 to the facade interspace 23. In variants of this, the air inlet 24 is disposed even higher. For instance, in one variant, it is disposed three meters above the ground 72. In a further variant, by contrast, it is disposed four meters above the ground. It may alternatively be disposed even higher.

Above the air inlet 24, the twin facade 20 comprises an air outlet 25 for discharge of at least a portion of the air stream 50 from the facade interspace 23. In the embodiment shown in FIG. 1, the air outlet 25 serves to discharge the entire air stream 50 from the facade interspace 23. However, it is also possible that the outer facade 22, in the region of the air outlet 25, additionally has flaps or slide vanes for regulation of the air stream 50, with which, for example, further openings in the outer facade 22 can be opened. In this case, the air outlet 25 serves solely for discharge of a portion of the air stream 50 from the facade interspace 23, since the remaining portion of the air stream 50 can exit from the facade interspace 23 through the further openings.

In the embodiment shown in FIG. 1, the air outlet 25 is disposed at an upper end of the facade interspace 23. Arranged directly adjoining the air outlet 25, above the air outlet 25, is the carbon dioxide segregation apparatus 2. As shown in somewhat more detail in FIGS. 5a, 5b and 5c in two variants, the carbon dioxide segregation apparatus 2 has an interior 3 and an air flow air inlet 4 for introduction of at least part of the air stream 50. In this arrangement, the entire proportion of the air stream 50 that flows through the air outlet 25 from the facade interspace 23 flows through the air flow air inlet 4 into the interior 3 of the carbon dioxide segregation apparatus 2 for segregation of the carbon dioxide. The carbon dioxide segregation apparatus 2 further comprises an air flow air outlet 5 for discharge of the air entered the interior 3 of the carbon dioxide segregation apparatus 2 into the environment 60 of the above-ground construction 100.

The outer facade 22 is a glass facade and comprises outer facade glass 27. 99% of a surface of the outer facade 22 facing the environment 60 is formed by outer facade glass 27. In variants thereof, another proportion of the surface of the outer facade 22 is formed by outer facade glass 27. Thus, in one variant, 70% of the surface of the outer facade 22 is formed by outer facade glass 27. In a further variant, 80% of the surface of the outer facade 22 is formed by outer facade glass 27. In a further variant, 90% surface of the outer facade 22 is formed by outer facade glass 27.

Since the outer facade 22 is a glass facade, in daylight or sunlight, penetrates through the outer facade 22 into the facade interspace 23. This means that, according to the position of the sun and alignment of the twin facade 20, direct solar radiation or indirect solar radiation penetrates through the outer facade 22 into the facade interspace 23. This direct or indirect solar radiation heats the air in the facade interspace 23, which sets a chimney effect in motion, and the air stream 50 is correspondingly generated and obtained.

In order to generate the vertically aligned air stream 50 by chimney effect, either a temperature $T_1$ of the air stream 50 in a region of the air inlet 24 and hence in a lower region of the facade interspace 23 is greater than a temperature $T_2$ of the air stream 50 in a region of the air outlet 25 and hence in an upper region of the facade interspace 23 or the temperature $T_1$ of the air stream in the region of the air inlet 24 is the same as the temperature $T_2$ of the air stream 50 in the region of the air outlet 25, where the temperature $T_1$ of the air stream 50 in the region of the air inlet 24 and the temperature $T_2$ of the air stream 50 in the region of the air outlet 25 is greater than a temperature $T_U$ of the air in the environment 60 of the above-ground construction 70 and hence of the ambient air 61. In the first case, the air stream 50 is additionally boosted when the temperature $T_1$ of the air stream 50 in the region of the air inlet 24 is additionally greater than the temperature $T_U$ of the ambient air 61. Moreover, in the first case, the air stream 50 is boosted when the temperature $T_2$ of the air stream 50 in the region of the air outlet 25 is greater than the temperature $T_U$ of the ambient air 50.

Below a middle 28 of the twin facade 20 between the air inlet 24 and the air outlet 25, 50% of the outer facade glass 27 is clear glass. As a result, beneath the middle 28 of the twin facade 20, more solar radiation gets into the facade interspace 23 and to the inner facade 21. Correspondingly, air present in the facade interspace 23 beneath the middle 28 of the twin facade 20 is more strongly heated in the event of insolation, which increases the temperature $T_1$ of the air in the region of the air inlet 24. This boosts the chimney effect and hence the air stream 50. In variants thereof, the proportion of clear glass chosen in the outer facade glass 27 may also be different. For instance, in illustrative variants, beneath the middle 28 of the twin facade 20 between the air inlet 24 and the air outlet 25, 60%, 70%, 80%, 90% or 100% of the outer facade glass 27 is clear glass. In a further variant, by contrast, no outer facade glass 27 beneath the middle 28 of the twin facade 20 between the air inlet 24 and the air outlet 25 is clear glass.

Above the middle 28 of the twin facade 20 between the air inlet 24 and the air outlet 25, 10% of the outer facade glass 27 is solar radiation-absorbing. In one variant thereof, 50% of the outer facade glass 27 is solar radiation-absorbing. In a further variant thereof, 100% of the outer facade glass 27 is solar radiation-absorbing. In a first variant, the solar radiation-absorbing outer facade glass has an iron oxide content of 0.3 percent by weight. In a second variant, the solar radiation-absorbing outer facade glass has an iron oxide content of 0.5 percent by weight. In a third variant, the solar radiation-absorbing outer facade glass has an iron oxide content of 0.8 percent by weight. In a fourth variant, the solar radiation-absorbing outer facade glass has an iron oxide content of 1.0 percent by weight. In variants of these variants, the iron oxide content is even higher. In a further variant, the outer facade glass 27 above the middle 28 of the twin facade 20 between the air inlet 24 and the air outlet 25 has an iron oxide content of not more than 0.2 percent by weight or does not include any iron oxide at all.

In one variant of the aforementioned variants with solar radiation-absorbing outer facade glass 27, 10% of the outer facade glass 27 above the middle 28 of the twin facade 20 between the air inlet 24 and the air outlet 25 has at least two layers with a solar radiation-absorbing interlayer disposed between the at least two layers. Such two-layer glass having a solar radiation-absorbing interlayer is known. In a further variant, 50% of the outer facade glass 27 above the middle 28 of the twin facade 20 between the air inlet 24 and the air outlet 25 has at least two layers with a solar radiation-absorbing interlayer disposed between the at least two layers. In a further variant, 100% of the outer facade glass 27 above the middle 28 of the twin facade 20 between the air inlet 24 and the air outlet 25 has at least two layers with a solar radiation-absorbing interlayer disposed between the at least two layers. In a further three variants, rather than the solar radiation-absorbing interlayer, a solar radiation-reflecting interlayer is used. Such solar radiation-reflecting interlayers are likewise known. In a further three variants, the interlayer is not just solar radiation-absorbing or just solar radiation-reflecting but both solar radiation-absorbing and solar radiation-reflecting. Such both solar radiation-absorbing and solar radiation-reflecting interlayers are likewise known. In further variants, above the middle 28 of the twin facade 20 between the air inlet 24 and the air outlet 25, said proportion of the outer facade glass 27 has an iron oxide content of more than 0.2 percent by weight and said proportion of the outer facade glass 27 has at least two layers and a solar radiation-absorbing, solar radiation-reflecting, or both solar radiation-absorbing and solar radiation-reflecting interlayer in between. Outer facade glass 27 here may also have at least two layers and one such interlayer and an iron oxide content of more than 0.2 percent by weight. In this case, it is sufficient when one of the at least two layers has such an iron oxide content. It will be appreciated that it is also possible, however, for two or all of the at least two layers to have such an iron oxide content, or for the outer facade glass to have an elevated proportion of a component other than iron oxide in order to achieve the solar radiation-absorbing properties of the outer facade glass.

In all these variants, above the middle 28 of the twin facade 20 between the air inlet 24 and the air outlet 25, 10%, or 50%, or 100%, of the outer facade glass 27 is solar radiation-absorbing or solar radiation-reflecting or both solar radiation-absorbing and solar radiation-reflecting. Accordingly, above the middle 28 of the twin facade 20 between the air inlet 24 and the air outlet 25, less solar radiation penetrates into the facade interspace 23 and to the inner facade 21. As a result, air present in the facade interspace 23 above the middle 28 of the twin facade 20 is less strongly heated on insolation. This means that the temperature $T_2$ of the air in a region of the air outlet 25 is reduced or less strongly heated, which boosts the chimney effect and hence the air stream 50.

In a first variant, which achieves the same effect, above the middle 28 of the twin facade 20 between the air inlet 24 and the air outlet 25, 10% of the outer facade glass 27 has a solar radiation-absorbing outer facade glass coating 29. In a second variant, which likewise achieves the same effect, above the middle 28 of the twin facade 20 between the air inlet 24 and the air outlet 25, 50% of the outer facade glass 27 has a solar radiation-absorbing outer facade glass coating 29. In a third variant, which likewise achieves the same effect, above the middle 28 of the twin facade 20 between the air inlet 24 and the air outlet 25, 100% of the outer facade glass 27 has a solar radiation-absorbing outer facade glass coating 29. In three further variants, which achieve the same effect, above the middle 28 of the twin facade 20 between the air inlet 24 and the air outlet 25, 10%, or 50%, or 100%, of the outer facade glass 27 has a solar radiation-reflecting outer facade glass coating 29. In three further variants, which achieve the same effect, above the middle 28 of the twin facade 20 between the air inlet 24 and the air outlet 25, 10%, or 50%, or 100% of the outer facade glass 27 has a both solar radiation-reflecting and solar radiation-reflecting outer facade glass coating 29.

In these nine variants too, above the middle 28 of the twin facade 20 between the air inlet 24 and the air outlet 25, 10%, or 50%, or 100%, of the outer facade glass 27 is solar radiation-absorbing or solar radiation-reflecting or both solar radiation-absorbing and solar radiation-reflecting.

The aforementioned nine variants with an outer facade glass coating 29 may exist as they are, without the preceding variants in which outer facade glass 27 is solar radiation-absorbing and for this purpose contains an iron oxide content of more than 0.2 percent by weight or has at least two layers with a solar radiation-absorbing or solar radiation-reflecting interlayer disposed between the at least two layers. They may alternatively exist in combination with one of the aforementioned variants in which outer facade glass 27 is solar radiation-absorbing and for this purpose has an iron oxide content of more than 0.2 or has at least two layers with a solar radiation-absorbing or solar radiation-reflecting interlayer disposed between the at least two layers. In principle it applies here that the greater the proportion of solar radiation-reflecting or solar radiation-absorbing outer facade glass 27 above the middle 28 of the twin facade 20, the greater the boost to the chimney effect and hence to the air stream 50.

In variants of the aforementioned variants with outer facade glass coating 29, the outer facade glass coating 29 is an electrochromic coating which becomes solar radiation-absorbing on application of a voltage. In further variants of the aforementioned variants with outer facade glass coating 29, the outer facade glass coating 29 is an electrochromic coating which becomes solar radiation-reflecting on application of a voltage. In further variants of the aforementioned variants with outer facade glass coating 29, the outer facade glass coating 29 is a thermochromic coating which becomes increasingly solar radiation-absorbing with increasing temperature. In further variants of the aforementioned variants with outer facade glass coating 29, the outer facade glass coating 29 is a thermochromic coating which becomes increasingly solar radiation-reflecting with increasing temperature.

In variants of the aforementioned variants with at least two-layer outer facade glass 27 with an interlayer, the interlayer is an electrochromic interlayer which becomes solar radiation-absorbing on application of a voltage. In further variants of the aforementioned variants with at least two-layer outer facade glass 27 with an interlayer, the interlayer is an electrochromic interlayer which becomes solar radiation-reflecting on application of a voltage. In further variants of the aforementioned variants with at least two-layer outer facade glass 27 with an interlayer, the interlayer is a thermochromic interlayer which becomes increasingly solar radiation-absorbing with increasing temperature. In further variants of the aforementioned variants with at least two-layer outer facade glass 27 with an interlayer, the interlayer is a thermochromic interlayer which becomes increasingly solar radiation-reflecting with increasing temperature.

The inner facade 21 comprises inner facade glass 30. A surface of the inner facade 21 facing the facade interspace 23 here is formed to an extent of 80% from inner facade glass 30. In variants thereof, a different proportion of this surface of the inner facade 21 is formed from inner facade glass 30. For instance, in one variant, 70% of the surface of the inner facade 21 is formed from inner facade glass 30. In a further variant, 50% of the surface of the inner facade 21 is formed from inner facade glass 30. In a further variant, 30% is of the surface of the inner facade 21 formed from inner facade glass 30.

Beneath the middle 28 of the twin facade 20 between the air inlet 24 and the air outlet 25, 10% of the inner facade glass 30 is solar radiation-absorbing. In one variant thereof, 50% of the inner facade glass 30 is solar radiation-absorbing. In a further variant thereof, 100% of the inner facade glass 30 is solar radiation-absorbing. In a first variant, the solar radiation-absorbing inner facade glass has an iron oxide content of 0.3 percent by weight. In a second variant, the solar radiation-absorbing inner facade glass has an iron oxide content of 0.5 percent by weight. In a third variant, the solar radiation-absorbing inner facade glass has an iron oxide content of 0.8 percent by weight. In a fourth variant, the solar radiation-absorbing inner facade glass has an iron oxide content of 1.0 percent by weight. In further variants, it is also possible that the iron oxide content is higher. In a further variant, beneath the middle 28 of the twin facade 20 between the air inlet 24 and the air outlet 25, the inner facade glass 30 has an iron oxide content of not more than 0.2 percent by weight or does not include any iron oxide at all.

In one variant of the aforementioned variants having inner facade glass 27 having an iron oxide content of more than 0.2 percent by weight, beneath the middle 28 of the twin facade 20 between the air inlet 24 and the air outlet 25, 10% of the inner facade glass 30 has at least two layers with a solar radiation-absorbing interlayer disposed between the at least two layers. Such two-layer glass having a solar radiation-absorbing interlayer is known. In a further variant, beneath the middle 28 of the twin facade 20 between the air inlet 24 and the air outlet 25, 50% of the inner facade glass 30 has at least two layers with a solar radiation-absorbing interlayer disposed between the at least two layers. In a further variant, beneath the middle 28 of the twin facade 20 between the air inlet 24 and the air outlet 25, 100% of the inner facade glass 30 has at least two layers with a solar radiation-absorbing interlayer disposed between the at least two layers. In a further three variants, rather than the solar radiation-absorbing interlayer, a solar radiation-reflecting interlayer is used. Such solar radiation-reflecting interlayers are likewise known. In a further three variants, the interlayer is not just solar radiation-absorbing or just solar radiation-reflecting, but both solar radiation-absorbing and solar radiation-reflecting. Such both solar radiation-absorbing and solar radiation-reflecting interlayers are likewise known. In further variants, beneath the middle 28 of the twin facade 20 between the air inlet 24 and the air outlet 25, said proportion of the inner facade glass 30 has an iron oxide content of more than 0.2 percent by weight and said proportion of the inner facade glass 30 has at least two layers and a solar radiation-absorbing, solar radiation-reflecting, or both solar radiation-absorbing and solar radiation-reflecting interlayer in between. Inner facade glass 30 here may also have at least two layers and such an interlayer, and an iron oxide content of more than 0.2 percent by weight. In this case, it is sufficient when one of the at least two layers has such an iron oxide content. It is of course also possible, however, for two or all of the at least two layers to have this iron oxide content.

In all these variants, beneath the middle 28 of the twin facade 20 between the air inlet 24 and the air outlet 25, 10%, or 50%, or 100%, of the inner facade glass 30 is solar radiation-absorbing or solar radiation-reflecting or both solar radiation-absorbing and solar radiation-reflecting. Accordingly, beneath the middle 28 of the twin facade 20 between the air inlet 24 and the air outlet 25, more solar radiation is absorbed or reflected by the inner facade 21. In the case of increased absorption, the inner facade 21 heats up more strongly, which means that air in the facade interspace 23 is heated more strongly. In the case of increased reflection, by contrast, more solar radiation is reflected back into the facade interspace 23 by the inner facade 21, which means that air in the facade interspace 23 is likewise more strongly heated. Thus, both effects more strongly increase the temperature $T_1$ in the region of the air inlet 24, which boosts the chimney effect and hence the air stream 50.

In a first variant, which achieves the same effect, beneath the middle 28 of the twin facade 20 between the air inlet 24 and the air outlet 25, 10% of the inner facade glass 30 has a solar radiation-absorbing inner facade glass coating 31. In a second variant, which likewise achieves the same effect, beneath the middle 28 of the twin facade 20 between the air inlet 24 and the air outlet 25, 50% of the inner facade glass 30 has a solar radiation-absorbing inner facade glass coating 31. In a third variant, which likewise achieves the same effect, above the middle 28 of the twin facade 20 between the air inlet 24 and the air outlet 25, 100% of the inner facade glass 30 has a solar radiation-absorbing inner facade glass coating 31. In three further variants, which achieve the same effect, beneath the middle 28 of the twin facade 20 between the air inlet 24 and the air outlet 25, 10%, or 50%, or 100%, of the inner facade glass 27 has a solar radiation-reflecting inner facade glass coating 31. In three further variants, which achieve the same effect, beneath the middle 28 of the twin facade 20 between the air inlet 24 and the air outlet 25, 10%, or 50%, or 100%, of the inner facade glass 30 has a both solar radiation-reflecting and solar radiation-reflecting inner facade glass coating 31.

In these nine variants too, beneath the middle 28 of the twin facade 20 between the air inlet 24 and the air outlet 25, 10%, or 50%, or 100%, of the inner facade glass 30 is solar radiation-absorbing or solar radiation-reflecting or both solar radiation-absorbing and solar radiation-reflecting.

The aforementioned nine variants with an inner facade glass coating 31 may exist as they are, without the preceding variants in which inner facade glass 30 is solar radiation-absorbing or has an iron oxide content of more than 0.2 percent by weight or has at least two layers with a solar radiation-absorbing or solar radiation-reflecting interlayer disposed between the at least two layers. They may alternatively exist in combination with one of the aforementioned variants in which inner facade glass 30 has an iron oxide content of more than 0.2 percent by weight or has at least two layers with a solar radiation-absorbing or solar radiation-reflecting interlayer disposed between the at least two layers. In principle it applies here that the greater the proportion of solar radiation-reflecting or solar radiation-absorbing inner facade glass 30 beneath the middle 28 of the twin facade 20, the greater the boost to the chimney effect and hence to the air stream 50.

In variants of the aforementioned variants with inner facade glass coating 31, the inner facade glass coating 31 is an electrochromic coating which becomes solar radiation-absorbing on application of a voltage. In further variants of the aforementioned variants with inner facade glass coating 31, the inner facade glass coating 31 is an electrochromic coating which becomes solar radiation-reflecting on application of a voltage. In further variants of the aforementioned variants with inner facade glass coating 31, the inner facade glass coating 31 is a thermochromic coating which becomes decreasingly solar radiation-absorbing with increasing temperature. In further variants of the aforementioned variants with inner facade glass coating 31, the inner facade glass coating 31 is a thermochromic coating which becomes decreasingly solar radiation-reflecting with increasing temperature.

In variants of the aforementioned variants with at least two-layer inner facade glass 30 with an interlayer, the interlayer is an electrochromic interlayer which becomes solar radiation-absorbing on application of a voltage. In further variants of the aforementioned variants with at least two-layer inner facade glass 30 with an interlayer, the interlayer is an electrochromic interlayer which becomes solar radiation-reflecting on application of a voltage. In further variants of the aforementioned variants with at least two-layer inner facade glass 30 with an interlayer, the interlayer is a thermochromic interlayer which becomes decreasingly solar radiation-absorbing with increasing temperature. In further variants of the aforementioned variants with at least two-layer inner facade glass 27 with an interlayer, the interlayer is a thermochromic interlayer which becomes decreasingly solar radiation-reflecting with increasing temperature.

The twin facade arrangement 1 shown in FIG. 1 comprises a heating apparatus 40 for heating of the air stream 50 in the facade interspace 23. This heating apparatus 40 is disposed on the inner facade 21 just above the air inlet 24 and thus serves for heating of the air stream 50 in the facade interspace 23 beneath the middle 28 of the twin facade 20 between air inlet 24 and air outlet 25. The heating apparatus 40 is a heat pump which draws heat from the interior of the above-ground construction 70 and supplies it to the air stream 50. In one variant thereof, the heating apparatus 40 is a heat exchanger which releases heat from the interior of the above-ground construction 70 to the air stream 50. In a further variant, the heating apparatus 40 is another kind of heating apparatus, for example an electrical heating apparatus or an oil- or gas-driven heating apparatus.

In addition, the twin facade arrangement 1 comprises a temperature control apparatus 41 for cooling and heating of the air stream 50 in the facade interspace 23. Since the temperature control apparatus 41 is disposed in the air outlet 25, it serves for cooling and heating of the air stream 50 in the facade interspace 23 above the middle 28 of the twin facade 20 between air inlet 24 and air outlet 25. The temperature control apparatus 41 is a heat pump. In one variant thereof, the temperature control apparatus 41 is a heat exchanger. Irrespective of the construction and mode of function of the temperature control apparatus 41, the temperature control apparatus 41 serves, in a first variant, solely to heat the air stream 50 above the middle 28 of the twin facade 20 between the air inlet 24 and the air outlet 25. In a second variant, the temperature control apparatus 41 serves solely to cool the air stream 50 above the middle 28 of the twin facade 20 between the air inlet 24 and the air outlet 25. In a third variant, the temperature control apparatus 41 serves both to heat and to cool the air stream 50 above the middle 28 of the twin facade 20 between the air inlet 24 and the air outlet 25, in that the air stream 50 can be heated when required and cooled when required.

The twin facade arrangement 1 comprises a propeller apparatus 42 with a propeller 43 disposed in the facade interspace 23 for prevention of a flow directed downward and hence for formation of a flow of the air stream 50 directed vertically upward by control of a resistance of the propeller 43 to rotation.

Figure 2:
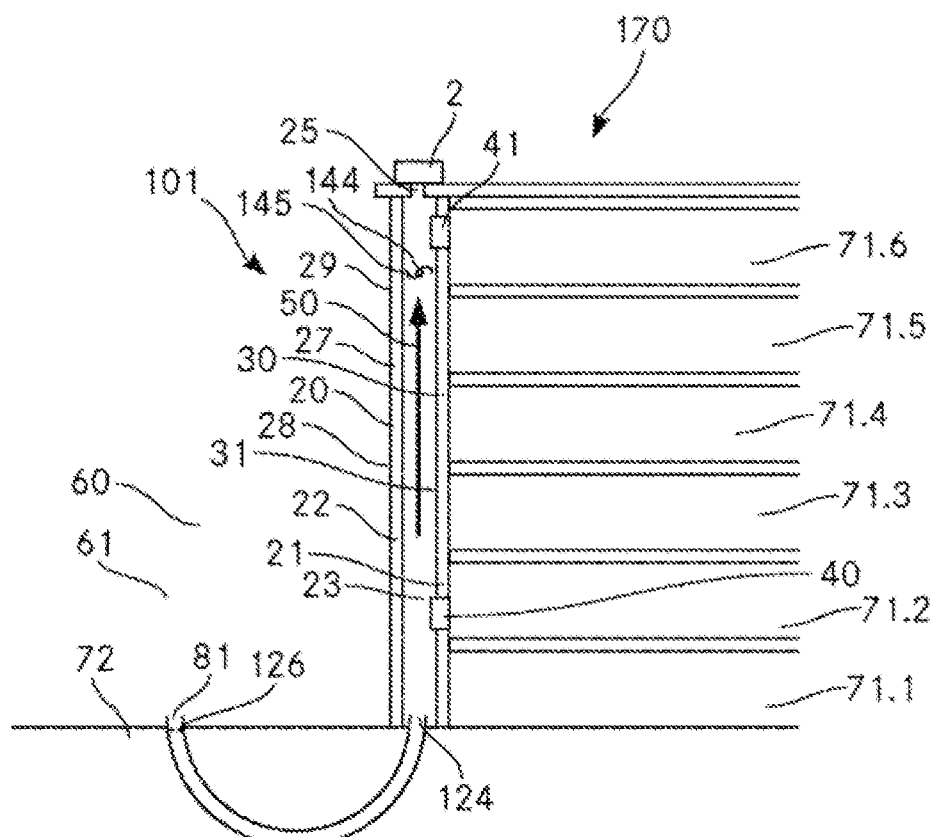

FIG. 2 shows a simplified schematic diagram of a cross section through a further above-ground construction 170 with a further inventive twin facade arrangement 101, wherein the above-ground construction 170 and the twin facade arrangement 101 are of nearly identical construction to the above-ground construction 70 shown in various variants in FIG. 1 or the twin facade arrangement 1 shown in various variants in FIG. 1. The representation in FIG. 2 is also identical in large parts to the representation in FIG. 1.

By contrast with the twin facade arrangement 1 shown in FIG. 1, in the twin facade arrangement 101 shown in FIG. 2, the air inlet 124 is disposed not in the outer facade 22 but at the lower end of the facade interspace 23, leading into the ground 72. The twin facade arrangement 101 here comprises an air conduit 80 connected to the air inlet 124, wherein ambient air 61 is guidable through the air conduit 80 via the air inlet 124 into the facade interspace 23. The air conduit here comprises an inlet 81 that leads into the ground 72 surrounding the above-ground construction 170, and through which ambient air 61 can be introduced into the air conduit from the environment of the above-ground construction 170. If a road leads through the environment of the above-ground construction 170, the inlet 81 is disposed in or alongside the road. This sucks exhaust gases from the road traffic from the road downward into the ground 72 and guides them through the air conduit 80 via air inlet 124 into the facade interspace 23 of the twin facade 20 for treatment with the carbon dioxide segregation apparatus 2. In order not to guide soot, dirt and fine particles from the road traffic into the facade interspace 23 at the same time, a particle filter 126 is disposed in the inlet 81.

Moreover, the twin facade arrangement 101 shown in FIG. 2, rather than the propeller apparatus 42 with the propeller 43, comprises a turbine 144 with a turbine wheel 145 disposed in the facade interspace 23 for generation of electrical energy. This electrical energy can be used for operation of the above-ground construction 100 or an element of the twin facade arrangement 101. This electrical energy can also be fed into the power supply grid. In one variant, the twin facade arrangement 101 additionally comprises a power storage means, especially a battery, in order to be able to store electrical energy generated by the turbine 144 and to be able to use it later if required.

Figure 3:
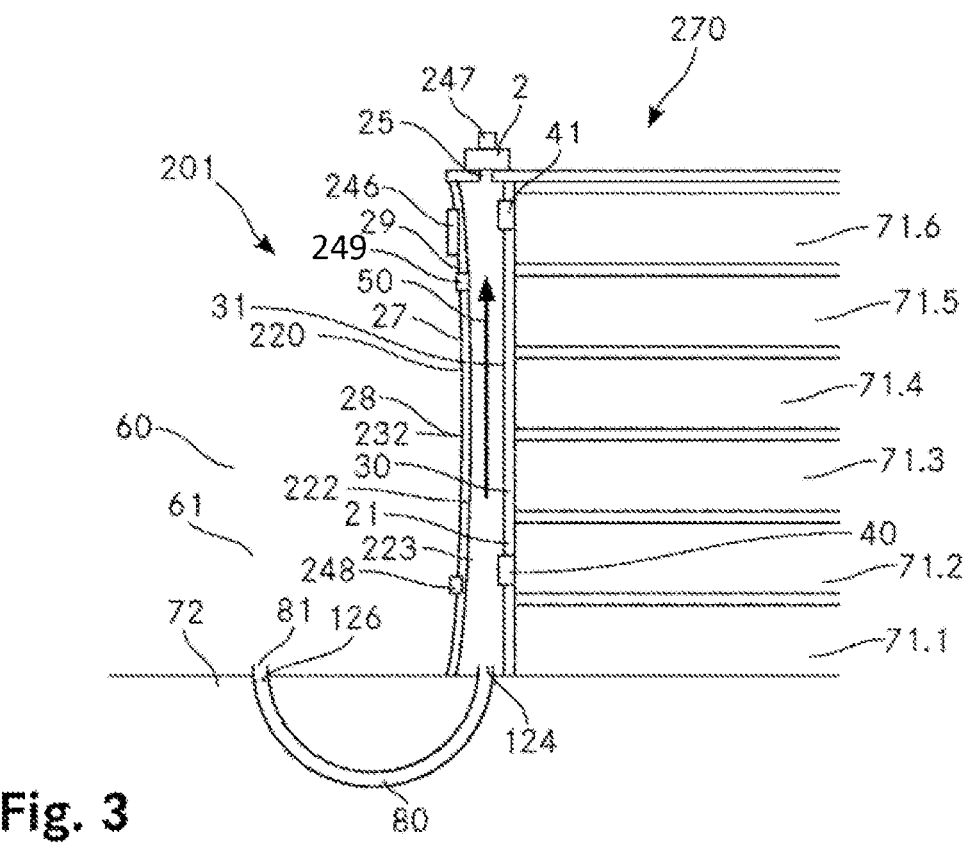

FIG. 3 shows a simplified schematic diagram of a cross section through a further above-ground construction 270 with a further inventive twin facade arrangement 201, wherein the above-ground construction 270 and the twin facade arrangement 201 are of virtually identical construction to the above-ground construction 170 shown in various variants in FIG. 2 or the twin facade arrangement 101 shown in various variants in FIG. 2. The representation in FIG. 3 is also identical in large parts to the representation in FIGS. 1 and 2.

By contrast with the twin facade arrangements 1, 101 shown in FIGS. 1 and 2, in the twin facade arrangement 201 shown in FIG. 3, the facade interspace 223 is in hyperbolic form and has a pinch point 232 disposed between the air inlet 124 and the air outlet 25, as a result of which the distance between the outer facade 222 and the inner facade 21 decreases both proceeding from the air inlet 124 toward the pinch point 232 and proceeding from the air outlet 25 toward the pinch point 232. In order to achieve this, the outer facade 222 of the twin facade 220 is in hyperbolic form and correspondingly curved. In one variant thereof, rather than the outer facade 222, the inner facade 21 is in hyperbolic form. In a further variant thereof, both the outer facade 222 and the inner facade 21 are in hyperbolic form.

Moreover, the twin facade arrangement 201 shown in FIG. 3, rather than the propeller apparatus 42 with the propeller 43 and rather than the turbine 144 with the turbine wheel 145, has a photovoltaic module 246 for generation of electrical energy. This photovoltaic module 246 is disposed on the outer facade 222.

Moreover, the twin facade arrangement 201 shown in FIG. 3 has a draft booster 247, in order to actively boost the air stream 50. This draft booster 247 is disposed above the carbon dioxide segregation apparatus 2 in the air stream air outlet 5. This means that the draft booster 247 is disposed in the region of the air outlet 25 and actively draws air through the air stream air outlet 5 from the interior 3 of the carbon dioxide segregation apparatus 2 and hence through the air stream air inlet 4 and the air outlet 25 from the facade interspace 223. In the present embodiment, the draft booster 247 is driven by wind in the ambient air 61. In one variant for this purpose, the draft booster 247, however, has an electric motor as drive, which is driven by electrical energy from the photovoltaic module 246. If the twin facade arrangement comprises the turbine 144, the electric motor may alternatively be driven by electrical energy from the turbine 144.

Moreover, the twin facade arrangement 201 shown in FIG. 3 comprises a flap 248 disposed in the outer facade 222 and a slide vane 249 disposed in the outer facade 222. Both may be opened and closed by driving by electrical energy from the photovoltaic module 246. In the present embodiment, the flap 248 is disposed three meters above the ground 72. Thus, it is beneath the middle 28 of the twin facade 220. When the flap 248 is open, it serves as an additional air inlet in order to admit ambient air 61 into the facade interspace 223. Moreover, in the present embodiment, the slide vane 249 is disposed just below the photovoltaic module 246 but still well above the middle 28 of the twin facade 220. When the slide vane 249 is open, it serves as an additional air outlet, in order to release a portion of the air stream 50 from the facade interspace 223 into the environment 60 of the above-ground construction 270. Thus, both the flap 248 and the slide vane 249 can be used to control a strength of the air stream 50.

Figure 4:
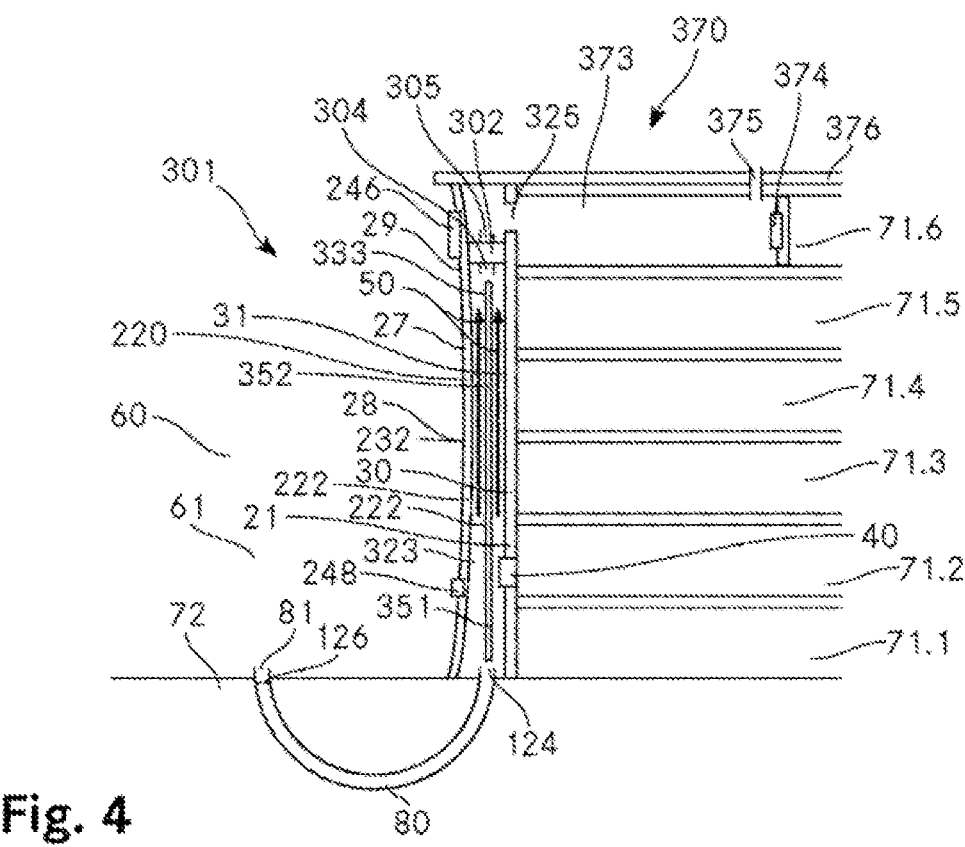

FIG. 4 shows a simplified schematic diagram of a cross section through a further above-ground construction 370 with a further inventive twin facade arrangement 301, with the above-ground construction 370 and the twin facade arrangement 301 being of virtually identical construction to the above-ground construction 270 shown in various variants in FIG. 3 and the twin facade arrangement 201 shown in various variants in FIG. 2. The representation in FIG. 4 is also identical in large parts to the representation in FIGS. 1, 2 and 3.

By contrast with the twin facade arrangements 1, 101, 201 shown in FIGS. 1, 2 and 3, the twin facade arrangement 301 shown in FIG. 4 has a mechanical, adjustable shade system 333 having shutters and blinds. This shade system 333 is controlled electronically, using electrical energy generated by the photovoltaic module 246 for operation. As apparent in FIG. 4, the shade system 333 is disposed in the middle between outer facade 222 and inner facade 21. Correspondingly, the air stream 50 runs both on a side of the shade system 333 assigned to the outer facade 222 and on a side of the shade system 333 assigned to the inner facade 21. Thus, the shade system 333 is part of an intermediate facade 351. In one variant for this purpose, the shade system 333 is disposed directly on the outer facade 222. In a further variant, by contrast, the shade system 333 is disposed directly on the inner facade 21. In all these variants, and additionally irrespective of whether the twin facade arrangement comprises a shade system 333 or not, the twin facade may additionally have one or more intermediate facades disposed between the outer facade and the inner facade, such that the air stream runs both on the outer facade side and on the inner facade side of the one or more intermediate facades in the facade interspace. FIG. 4 may be cited as an illustration of this. For illustration purposes, the shade system 333 can be regarded here simply as an intermediate facade 351. It is immaterial here whether the intermediate facade 351 is formed by the shade system 333 or whether the one or more intermediate facades, for example, are each glass facades.

In one variant, the intermediate facade 351 comprises intermediate facade glass 352. One surface of the intermediate facade 21 is formed here to an extent of 80% from intermediate facade glass 352. In variants thereof, another proportion of this surface area of the intermediate facade 351 is formed from intermediate facade glass 352. For instance, in one variant, 70% of the surface area of the intermediate facade 351 is formed from intermediate facade glass 352. In a further variant, 50% of the surface area of the intermediate facade 351 is formed from intermediate facade glass 352. In a further variant, 30% is of the surface area of the intermediate facade 351 formed from intermediate facade glass 351.

Beneath the middle 28 of the twin facade 20 between the air inlet 24 and the air outlet 25, 10% of the intermediate facade glass 352 is solar radiation-absorbing. In one variant thereof, 50% of the intermediate facade glass 352 is solar radiation-absorbing. In a further variant thereof, 100% of the intermediate facade glass 352 is solar radiation-absorbing. In a first variant, the solar radiation-absorbing intermediate facade glass has an iron oxide content of 0.3 percent by weight. In a second variant, the solar radiation-absorbing intermediate facade glass has an iron oxide content of 0.5 percent by weight. In a third variant, the solar radiation-absorbing intermediate facade glass has an iron oxide content of 0.8 percent by weight. In a fourth variant, the solar radiation-absorbing intermediate facade glass has an iron oxide content of 1.0 percent by weight. In further variants, it is also possible that the iron oxide content is higher. In a further variant, beneath the middle 28 of the twin facade 20 between the air inlet 24 and the air outlet 25, the intermediate facade glass 352 has an iron oxide content of not more than 0.2 percent by weight or does not include any iron oxide at all.

In one variant of the aforementioned variants with intermediate facade glass 352 having an iron oxide content of more than 0.2 percent by weight, beneath the middle 28 of the twin facade 20 between the air inlet 24 and the air outlet 25, 10% of the intermediate facade glass 352 has at least two layers with a solar radiation-absorbing interlayer disposed between the at least two layers. Such two-layer glass with a solar radiation-absorbing interlayer is known. In a further variant, beneath the middle 28 of the twin facade 20 between the air inlet 24 and the air outlet 25, 50% of the intermediate facade glass 352 has at least two layers with a solar radiation-absorbing interlayer disposed between the at least two layers. In a further variant, beneath the middle 28 of the twin facade 20 between the air inlet 24 and the air outlet 25, 100% of the intermediate facade glass 352 has at least two layers with a solar radiation-absorbing interlayer disposed between the at least two layers. In a further three variants, rather than the solar radiation-absorbing interlayer, a solar radiation-reflecting interlayer is used. Such solar radiation-reflecting interlayers are likewise known. In a further three variants, the interlayer is not just solar radiation-absorbing or just solar radiation-reflecting, but both solar radiation-absorbing and solar radiation-reflecting. Such both solar radiation-absorbing and solar radiation-reflecting interlayers are likewise known. In further variants, beneath the middle 28 of the twin facade 20 between the air inlet 24 and the air outlet 25, said proportion of the intermediate facade glass 352 has an iron oxide content of more than 0.2 percent by weight and said proportion of the intermediate facade glass 352 has at least two layers and a solar radiation-absorbing, solar radiation-reflecting, or both solar radiation-absorbing and solar radiation-reflecting interlayer disposed in between. It is also possible here for intermediate facade glass 352 to have at least two layers and one such interlayer, and an iron oxide content of more than 0.2 percent by weight. In this case, it is sufficient when one of the at least two layers has such an iron oxide content. It is of course also possible, however, for two or all of the at least two layers to have this iron oxide content.

In all these variants, beneath the middle 28 of the twin facade 20 between the air inlet 24 and the air outlet 25, 10%, or 50%, or 100%, of the intermediate facade glass 352 is solar radiation-absorbing or solar radiation-reflecting or both solar radiation-absorbing and solar radiation-reflecting. Correspondingly, beneath the middle 28 of the twin facade 20 between the air inlet 24 and the air outlet 25, the intermediate facade 351 absorbs or reflects more solar radiation. In the case of increased absorption, the intermediate facade 351 heats up more strongly, which means that air in the facade interspace 23 is heated more strongly. In the case of increased reflection, by contrast, more solar radiation is reflected back into the interspace between the outer facade 222 and the inner facade 21 by the intermediate facade 351, which means that air in the interspace is likewise more strongly heated. Thus, both effects more strongly increase the temperature $T_1$ in the region of the air inlet 24, which boosts the chimney effect and hence the air stream 50.

In a first variant, which achieves the same effect, beneath the middle 28 of the twin facade 20 between the air inlet 24 and the air outlet 25, 10% of the intermediate facade glass 352 has a solar radiation-absorbing intermediate facade glass coating 353. In a second variant, which likewise achieves the same effect, beneath the middle 28 of the twin facade 20 between the air inlet 24 and the air outlet 25, 50% of the intermediate facade glass 352 has a solar radiation-absorbing intermediate facade glass coating 353. In a third variant, which likewise achieves the same effect, above the middle 28 of the twin facade 20 between the air inlet 24 and the air outlet 25, 100% of the intermediate facade glass 352 has a solar radiation-absorbing intermediate facade glass coating 353. In three further variants, which achieve the same effect, beneath the middle 28 of the twin facade 20 between the air inlet 24 and the air outlet 25, 10%, or 50%, or 100%, of the intermediate facade glass 352 has a solar radiation-reflecting intermediate facade glass coating 353. In three further variants, which achieve the same effect, beneath the middle 28 of the twin facade 20 between the air inlet 24 and the air outlet 25, 10%, or 50%, or 100%, of the intermediate facade glass 352 has a both solar radiation-reflecting and solar radiation-reflecting intermediate facade glass coating 353.

In these nine variants too, beneath the middle 28 of the twin facade 20 between the air inlet 24 and the air outlet 25, 10%, or 50%, or 100%, of the intermediate facade glass 352 is solar radiation-absorbing or solar radiation-reflecting or both solar radiation-absorbing and solar radiation-reflecting.

The aforementioned nine variants with an intermediate facade glass coating 353 may exist as they are, without the preceding variants in which intermediate facade glass 30 is solar radiation-absorbing or has an iron oxide content of more than 0.2 percent by weight or at least two layers with a solar radiation-absorbing or solar radiation-reflecting interlayer disposed between the at least two layers. They may alternatively exist in combination with one of the preceding variants in which intermediate facade glass 352 has an iron oxide content of more than 0.2 percent by weight or at least two layers with a solar radiation-absorbing or solar radiation-reflecting interlayer disposed between the at least two layers. In principle it applies here that the greater the proportion of solar radiation-reflecting or solar radiation-absorbing intermediate facade glass 352 beneath the middle 28 of the twin facade 20, the greater the boost to the chimney effect and hence to the air stream 50.

In variants of the aforementioned variants with intermediate facade glass coating 353, the intermediate facade glass coating 353 is an electrochromic coating which becomes solar radiation-absorbing on application of a voltage. In further variants of the aforementioned variants with intermediate facade glass coating 353, the intermediate facade glass coating 353 is an electrochromic coating which becomes solar radiation-reflecting on application of a voltage. In further variants of the aforementioned variants with intermediate facade glass coating 353, the intermediate facade glass coating 353 is a thermochromic coating which becomes decreasingly solar radiation-absorbing with increasing temperature. In further variants of the aforementioned variants with intermediate facade glass coating 353, the intermediate facade glass coating 353 is a thermochromic coating which becomes decreasingly solar radiation-reflecting with increasing temperature.

In variants of the aforementioned variants with at least two-layer intermediate facade glass 352 with an interlayer, the interlayer is an electrochromic interlayer which becomes solar radiation-absorbing on application of a voltage. In further variants of the aforementioned variants with at least two-layer intermediate facade glass 352 with an interlayer, the interlayer is an electrochromic interlayer which becomes solar radiation-reflecting on application of a voltage. In further variants of the aforementioned variants with at least two-layer intermediate facade glass 352 with an interlayer, the interlayer is a thermochromic interlayer which becomes decreasingly solar radiation-absorbing with increasing temperature. In further variants of the aforementioned variants with at least two-layer intermediate facade glass 352 with an interlayer, the interlayer is a thermochromic interlayer which becomes decreasingly solar radiation-reflecting with increasing temperature.

Moreover, in the twin facade arrangement 301 shown in FIG. 4, the carbon dioxide segregation apparatus 302 is disposed within the facade interspace 323. As it goes through the facade interspace 323, the air stream 50 here also passes through the carbon dioxide segregation apparatus 302, in that it is guided through the air stream air inlet 304 into the interior of the carbon dioxide segregation apparatus 302 and is guided through the air stream air outlet 305 back out of the interior of the carbon dioxide segregation apparatus 302. Only after the air stream 50 has passed through the carbon dioxide segregation apparatus 302 is it passed through the air outlet 325 out of the facade interspace 323.

In the present embodiment, the air outlet 325 leads from the facade interspace 323 into a building interior 373 of the above-ground construction 370. Thus, the building interior 373 serves to accommodate the air flow 50 flowing out of the facade interspace 323 through the air outlet 325 and to cool it to a temperature $T_1$ less than the temperature $T_2$ of the air stream 50 in the region of the air outlet 325. For this purpose, firstly, the building interior 373 is thermally insulated. Secondly, the above-ground construction 370 comprises a cooling apparatus 374 with which the building interior 373 can be cooled. In addition, a volume of the building interior 373 is greater than a volume of the facade interspace 323, so as to enable adiabatic expansion of the air in the building interior 373 when it flows from the facade interspace 323 into the building interior 373. In order that the air of the air stream 50 can escape from the building interior 373, the building interior 373 has an outlet 375 into the environment 60 of the above-ground construction 370. In the representation of FIG. 4, the outlet 375 is shown disposed in the roof 376 of the above-ground construction 370. However, this is not obligatory. For instance, the outlet 375, in one variant, is disposed at the lower end of the twin facade 220 just above the ground 72.

In operation, the twin facade arrangements 1, 101, 201, 301 or above-ground constructions 70, 170, 270, 370 with the respective twin facade arrangement 1, 101, 201, 301 that are described above in association with FIGS. 1, 2, 3 and 4 are used for generation of the vertically directed air stream 50 by chimney effect and for segregation of carbon dioxide from the air of the air stream 50.

FIGS. 5a, 5b, 5c and 5d each show a simplified schematic diagram of a cross section through the carbon dioxide segregation apparatus 2, 302 for illustration of the manner of function of the carbon dioxide segregation apparatus 2, 302. FIGS. 5a, 5b, 5c and 5d here illustrate different variants of the manner of function of the carbon dioxide segregation apparatus 2, 302. In FIGS. 5a, 5b, 5c and 5d, the carbon dioxide segregation apparatus is given the reference numerals 2, 302. Moreover, in the four figures, the air flow air inlet is given the reference numerals 4, 304, and the air flow air outlet the reference numerals 5, 305. The reason for this is that the carbon dioxide segregation apparatus 2, 302 shown in FIGS. 5a, 5b, 5c and 5d, irrespective of its manner of function, can be used in any of the twin facade arrangements 1, 101, 201, 301 shown in various variants in FIGS. 1 to 4.

As already mentioned, the carbon dioxide segregation apparatus 2, 302 has an interior 3. Air of the air stream 50 here can get into the interior 3 through the air flow air inlet 4, 304 and exit again from the interior 3 through the air flow air outlet 5, 305. In the variant shown in FIG. 5a, the carbon dioxide segregation apparatus 2, 302, in the interior 3, comprises a membrane 6 of polytetrafluoroethylene (PTFE). This membrane 6 serves for separation of the air stream 50 and a liquid 7 present in a liquid reservoir 10, the liquid 7 in the present case being water having a fraction of propylene glycol. However, the membrane 6 is permeable to carbon dioxide and to nitrogen oxides and sulfur oxides, such that carbon dioxide, nitrogen oxides and sulfur oxides can pass from the air of the air stream 50 into the liquid 7. Correspondingly, the membrane 6 is a contact surface for contacting of air of the air stream 50 for segregation of carbon dioxide, nitrogen oxides and sulfur oxides from the air of the air stream 50. The membrane 6 here is a selectively permeable separation apparatus by means of which the air of the air stream 50 is separable from the liquid 7 and hence a fluid, with the selectively permeable separation apparatus being permeable to carbon dioxide, nitrogen oxides and sulfur oxides, by means of which carbon dioxide, nitrogen oxides and sulfur oxides can pass from the air of the air stream 50 into the liquid 7 or the fluid for segregation of the carbon dioxide, the nitrogen oxides and the sulfur oxides. Moreover, the carbon dioxide segregation apparatus 2, 302, in the variant shown in FIG. 5a, comprises a nanoporous metal foil 8, disposed in the liquid 7, with copper nanoparticles for adsorption of carbon dioxide. Such a metal foil 8 is described, for example, in the publication "High-Selectivity Electrochemical Conversion of $CO_2$ to Ethanol using a Copper Nanoparticle/N-Doped Graphene Electrode" by Yang Song et al., ChemistrySelect 2016, 1, 6055-6061. Carbon dioxide dissolved in the liquid 7 is adsorbed on the metal foil 8 and is converted to ethanol. Thus, in the variant shown in FIG. 5a, in a first step, carbon dioxide is segregated from the air of the air stream 50 by the membrane 6 into the liquid 7 and. In a second step, the carbon dioxide from the liquid 7 is converted to ethanol and hence segregated from the liquid 7. Since water vapor from the liquid 7 can pass through the membrane 6 into the air stream 50, the variant of the carbon dioxide segregation apparatus 2, 302 shown in FIG. 5a has a refilling inlet 9 for refilling the liquid 7 in the liquid reservoir 10.

In one variant, the membrane 6 is coated with a metal, for example gold, silver, platinum, palladium, copper, manganese, tantalum, vanadium or a combination thereof, and itself has a carbon dioxide-segregating effect.

In a further variant, the membrane 6 is coated with copper oxide. In contact with the liquid 7 or the water present in the liquid 7, this copper oxide forms copper hydroxide. This copper hydroxide is slightly basic and reacts with carbon dioxide dissolved in the water in the form of carbonic acid to give copper carbonate, which results in segregation of carbon dioxide. In addition, the copper hydroxide reacts with nitrogen oxides dissolved in the water to give copper nitrates, which results in segregation of nitrogen oxides. The copper hydroxide also reacts with sulfur oxides dissolved in the water to give copper sulfates, which results in segregation of sulfur oxides.

Figure 5A:
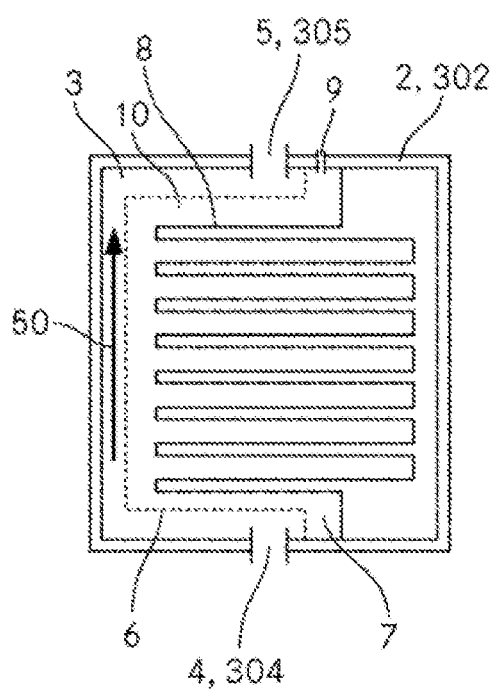
Figure 5B:
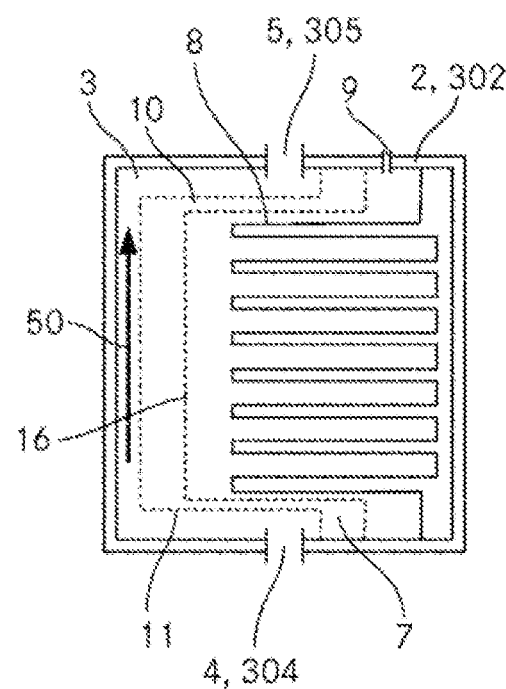
Figure 5C:
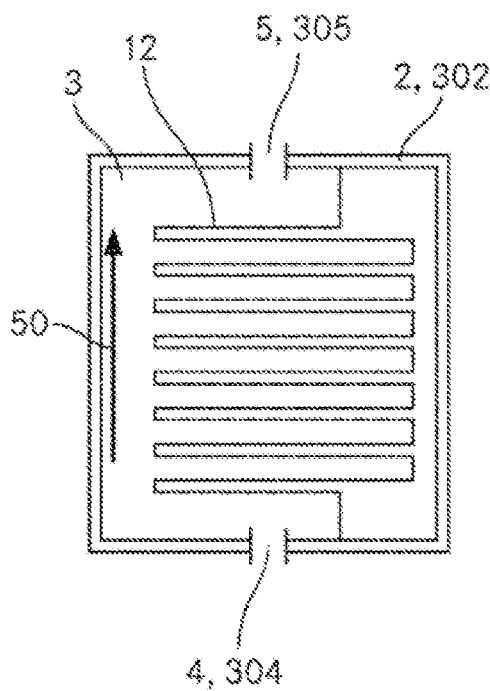

The variant of the carbon dioxide segregation apparatus 2, 302 shown in FIG. 5b corresponds in large parts to the variant of the carbon dioxide segregation apparatus 2, 302 shown in FIG. 5a. Rather than the membrane 6, however, the carbon dioxide segregation apparatus 2, 302 shown in FIG. 5b has a grid 11 by means of which the air of the air stream 50 is separable from air present on the opposite side of the grid 11 from the air of the air stream 50. This grid 11 has circular grid openings having a diameter of 0.1 mm. In this way, it is possible to stop relatively large particles in the air of the air stream 50, in a simple manner, from getting to an opposite side of the grid 11 from the air of the air stream 50. Moreover, this considerably reduces flows and turbulences in the air on the opposite side of the grid 11 from the air of the air stream 50 by comparison with flows and turbulences in the air in the air stream 50. Instead of this grid 11, the carbon dioxide segregation apparatus 2, 302 may alternatively have a mesh with mesh openings corresponding to the grid openings of the grid 11. But it is equally possible for the carbon dioxide segregation apparatus 2, 302, rather than the grid 11 or mesh, also to have a membrane. The grid 11, the mesh and the membrane form a contact surface for contacting of air of the air stream 50 for segregation of carbon dioxide, nitrogen oxides and sulfur oxides from the air of the air stream 50, wherein the contact surface is a selectively permeable separation apparatus, by means of which the air of the air stream 50 is separable from air present on the other side of the selectively permeable separation apparatus, wherein the selectively permeable separation apparatus is permeable to carbon dioxide, nitrogen oxides and sulfur oxides, by means of which carbon dioxide, nitrogen oxides and sulfur oxides can pass from the air of the air stream 50 into the air present on the opposite side of the grid 11 or of the mesh or of the membrane from the air of the air stream 50 for segregation of the carbon dioxide or of the nitrogen oxides or of the sulfur oxides.

Moreover, the variant of the carbon dioxide segregation apparatus 2, 302 shown in FIG. 5b has a further membrane 16 on the opposite side of the grid 11 from the air of the air stream 50. This further membrane 16 is manufactured from the same material and with the same features as the membrane 6 of the variant of the carbon dioxide segregation apparatus 2, 302 shown in FIG. 5a and may also be executed in the variants elucidated for FIG. 5a. The sole difference from this membrane 6 is that the further membrane 16 of the variant of the carbon dioxide segregation apparatus 2, 302 shown in FIG. 5b does not form a contact surface for contacting of air of the air stream 50 for segregation of carbon dioxide, nitrogen oxides and sulfur oxides from the air of the air stream 50, but rather is disposed behind the grid 11 from the point of view of the air of the air stream 50. This means that the further membrane 16 forms a further contact surface for contacting of the gas or of the air on the opposite side of the selectively permeable separation apparatus for segregation of carbon dioxide, nitrogen oxides and sulfur oxides from this gas or this air which is formed by the grid 11 or the mesh or the membrane from the air of the air stream 50.

Figure 5D:
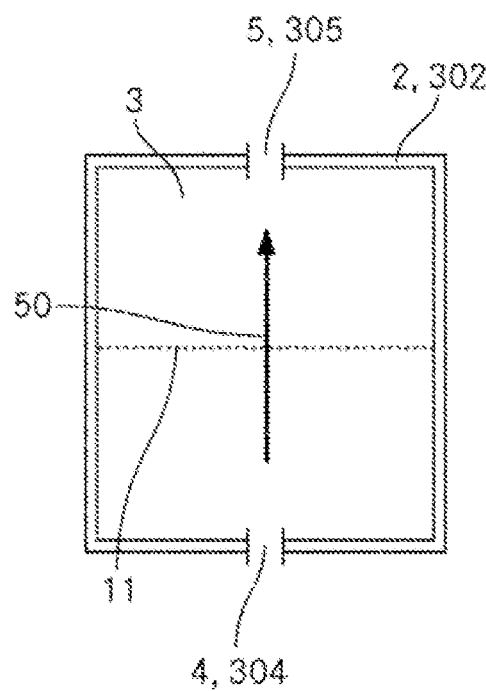

In the variant of the carbon dioxide segregation apparatus 2, 302 shown in FIG. 5d, the carbon dioxide segregation apparatus 2, 302, rather than the grid 11, the membrane 16, the liquid 7, the metal foil 8, the refilling inlet 9 and the liquid reservoir 10, comprises a porous ceramic 12. The porous ceramic here consists of a mixture of metal oxides and has pores having an average pore size of 5 μm. In one variant thereof, the average pore size is 20 μm. In a further variant thereof, the average pore size is 50 μm. In a further variant thereof, the average pore size is 70 μm. In a further variant thereof, the average pore size is 100 μm. Irrespective of the average pore size, the pores have a surface that comes into contact with the air stream 50 that forms a contact surface having carbon dioxide-segregating, nitrogen oxide-segregating and sulfur oxide-segregating action. In one variant, mosses, algae or bacteria are disposed in the pores, which absorb and bind carbon dioxide, nitrogen oxides and sulfur oxides from the air of the air stream 50.

In the variant of the carbon dioxide segregation apparatus 2, 302 shown in FIG. 5d, the carbon dioxide segregation apparatus 2, 302, rather than the membrane 6, liquid 7, metal foil 8, refilling inlet 9 and liquid reservoir 10, comprises a filter 11 for segregation of the carbon dioxide from the air of the air stream 50. This filter 11 is disposed in the interior 3 of the carbon dioxide segregation apparatus 2, 302 in such a way that the entire proportion of the air stream 50 which is guided through the interior 3 is guided through the filter 11. The active filter surface that comes into contact with the air stream 50 here forms a contact surface having carbon dioxide-segregating action.

In further variants, the carbon dioxide segregation apparatus 2, 302 works by a different principle. In one variant, the carbon dioxide segregation apparatus 2, 302 contains moss that segregates carbon dioxide, nitrogen oxides and sulfur oxides from the air of the air stream.

The invention is not limited to the embodiments described above and illustrated by the figures. Instead, further variants, combinations and embodiments are also obtainable directly by the person skilled in the art on the basis of the forms described.

In summary, it can be stated that a twin facade arrangement is provided, which is beneficial both to the climate and to the environment and locally increases the quality of life of humans, animals and plants in the direct environment of the twin facade arrangement.

The invention claimed is:

1. A twin facade arrangement for an above-ground construction comprising a twin facade for generation of a vertically directed air stream by chimney effect,
  a) wherein the twin facade comprises an inner facade and an outer facade, wherein a facade interspace for guiding the air stream exists between the inner facade and the outer facade, wherein the inner facade bounds the facade interspace with respect to the above-ground construction and the outer facade bounds the facade interspace with respect to an environment of the above-ground construction,
  b) wherein the twin facade comprises an air inlet for introduction of the air stream with air from the environment into the facade interspace and an air outlet, disposed above the air inlet, for discharge of at least a portion of the air stream from the facade interspace, and
  c) wherein the twin facade is configured such that a temperature of the air stream in the air inlet is higher than a temperature of the air stream in the air outlet to boost the chimney effect,
  wherein the twin facade arrangement comprises a carbon dioxide segregation apparatus for segregation of at least a portion of the carbon dioxide from the air of the air stream, wherein the carbon dioxide segregation apparatus has an interior, an air stream air inlet for an introduction of at least a portion of the air stream into the interior of the carbon dioxide segregation apparatus and an air flow air outlet for discharging the air that has got into the interior of the carbon dioxide segregation apparatus, wherein both the air stream air inlet and the air flow air outlet are connected to the facade interspace between the air inlet and the air outlet, such that at least a portion of the air stream is guided intermediately into the interior of the carbon dioxide segregation apparatus as it flows through the facade interspace from the air inlet to the air outlet for carbon dioxide segregation, wherein the carbon dioxide segregation apparatus comprises a contact surface for contacting air of the air stream for segregation of carbon dioxide from the air of the air stream, wherein the contact surface is within the interior of the carbon dioxide segregation apparatus, wherein the contact surface is a selectively permeable separation apparatus, by means of which air of the air stream is separable from a fluid, with the selectively permeable separation apparatus being permeable to carbon dioxide, by means of which carbon dioxide from the air of the air stream can get into the fluid for segregation of the carbon dioxide, and wherein the permeable separation apparatus is a membrane to separate air of the air stream from a fluid, wherein the membrane is permeable to carbon dioxide to enable carbon dioxide from the air of the air stream to get into the fluid for segregation of the carbon dioxide.

2. The twin façade arrangement as claimed in claim 1, wherein the outer facade is a glass facade and hence comprises outer facade glass, wherein at least 70% of a surface of the outer facade is formed by the outer facade glass.

3. The twin facade arrangement as claimed in claim 2, wherein at least 50% of the outer facade glass beneath a middle of the twin facade between the air inlet and the air outlet is clear glass.

4. The twin facade arrangement as claimed in claim 2, wherein at least 10% of the outer facade glass above the middle of the twin facade between the air inlet and the air outlet is at least one of solar radiation-absorbing and solar radiation-reflecting.

5. The twin facade arrangement as claimed in claim 2, wherein at least 10% of the outer facade glass above the middle of the twin facade between the air inlet and the air outlet has an outer facade glass coating, wherein the outer facade glass coating is at least one of solar radiation-absorbing and solar radiation-reflecting.

6. The twin façade arrangement as claimed in claim 1, wherein the inner facade comprises inner facade glass, wherein a surface of the inner facade facing the facade interspace is formed from inner facade glass at least to an extent of 30%.

7. The twin facade arrangement as claimed in claim 6, wherein at least 10% of the inner facade glass beneath the middle of the twin facade between the air inlet and the air outlet is at least one of solar radiation-absorbing and solar radiation-reflecting.

8. The twin facade arrangement as claimed in claim 6, wherein at least 10% of the inner facade glass beneath the middle of the twin facade between the air inlet and the air outlet has an inner facade glass coating, wherein the inner facade glass coating is at least one of solar radiation-absorbing and solar radiation-reflecting.

9. The twin facade arrangement as claimed in claim 1, wherein the twin facade arrangement includes a heating apparatus for heating of the air stream in the facade interspace beneath the middle of the twin facade between the air inlet and the air outlet.

10. The twin facade arrangement as claimed claim 1, wherein the twin facade arrangement includes a temperature control apparatus for at least one of cooling and heating of the air stream in the facade interspace above the middle of the twin facade between the air inlet and the air outlet.

11. The twin facade arrangement as claimed in claim 1, wherein the twin facade arrangement includes at least a flap, at least a slide vane, or both for regulation of the air stream.

12. The twin facade arrangement as claimed in claim 1, wherein in at least 70% of an area of the twin facade, a distance between the outer facade and the inner facade has a value within a range from 30 cm to 150 cm.

13. An above-ground construction having a twin facade arrangement as claimed in claim 1.

14. The use of a twin facade arrangement as claimed in claim 1 for generation of a vertically directed air stream by chimney effect and for segregation of carbon dioxide from the air of the air stream.

15. The twin facade arrangement as claimed in claim 2, wherein at least 50% of the outer facade glass above the middle of the twin facade between the air inlet and the air outlet is at least one of solar radiation-absorbing and solar radiation-reflecting.

16. The twin facade arrangement as claimed in claim 2, wherein at least 50% of the outer facade glass above the middle of the twin facade between the air inlet and the air outlet has an outer facade glass coating, wherein the outer facade glass coating is at least one of solar radiation-absorbing and solar radiation-reflecting.

17. The twin facade arrangement as claimed in claim 1, wherein the inner facade comprises inner facade glass, wherein a surface of the inner facade facing the facade interspace is formed from inner facade glass at least to an extent of 50%.

18. The twin facade arrangement as claimed in claim 1, wherein the inner facade comprises inner facade glass, wherein a surface of the inner facade facing the facade interspace is formed from inner facade glass at least to an extent of 70%.

19. The twin facade arrangement as claimed in claim 6, wherein at least 50% of the inner facade glass beneath the middle of the twin facade between the air inlet and the air outlet is solar radiation-absorbing, solar radiation-reflecting, or both.

20. The twin facade arrangement as claimed in claim 6, wherein at least 50% of the inner facade glass beneath the middle of the twin facade between the air inlet and the air outlet has an inner facade glass coating, wherein the inner facade glass coating is solar radiation-absorbing, solar radiation-reflecting, or both.

21. The twin facade arrangement as claimed in claim 1, wherein at least 70% of an area of the twin facade, a distance between the outer facade and the inner facade has a value within a range from 50 cm to 120 cm.

\* \* \* \* \*